United States Patent
Yin

(10) Patent No.: US 12,185,359 B2
(45) Date of Patent: Dec. 31, 2024

(54) CHANNEL DROPPING BEHAVIOR AND TIMING RELATIONSHIPS FOR UPLINK CHANNEL COLLISION WITH DIFFERENT PRIORITIES

(71) Applicant: SHARP KABUSHIKI KAISHA, Sakai (JP)

(72) Inventor: Zhanping Yin, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 306 days.

(21) Appl. No.: 17/771,630

(22) PCT Filed: Nov. 6, 2020

(86) PCT No.: PCT/JP2020/041573
§ 371 (c)(1),
(2) Date: Apr. 25, 2022

(87) PCT Pub. No.: WO2021/090924
PCT Pub. Date: May 14, 2021

(65) Prior Publication Data
US 2022/0377750 A1    Nov. 24, 2022

Related U.S. Application Data

(60) Provisional application No. 62/932,287, filed on Nov. 7, 2019.

(51) Int. Cl.
*H04W 72/56*    (2023.01)
(52) U.S. Cl.
CPC .................................. *H04W 72/56* (2023.01)

(58) Field of Classification Search
None
See application file for complete search history.

(56) References Cited

U.S. PATENT DOCUMENTS

| | | | |
|---|---|---|---|
| 2016/0278072 A1* | 9/2016 | Palle | H04W 72/542 |
| 2017/0195028 A1* | 7/2017 | Shimezawa | H04B 7/0626 |

OTHER PUBLICATIONS

Motorola Mobility et al., "PUSCH enhancement for URLLC", R1-1911037, 3GPP TSG RAN WG1 Meeting #98bis, Chongqing, China, Oct. 14-20, 2019.
Sharp, "Remaining issues of UCI enhancements for eURLLC", R1-1910934, 3GPP TSG RAN WG1 #98, Chongqing, China, Oct. 14-20, 2019.
Motorola Mobility et al., "UCI enhancement and intra-UE prioritization for URLLC", R1-1911036, 3GPP TSG RAN WG1 Meeting #98bis, Chongqing, China, Oct. 14-20, 2019.

* cited by examiner

*Primary Examiner* — Chi H Pham
*Assistant Examiner* — Raul Rivas
(74) *Attorney, Agent, or Firm* — ScienBiziP, P.C.

(57) ABSTRACT

A user equipment (UE) is described that includes a higher layer processor configured to determine that a high-priority channel collides with a low-priority channel. The high-priority channel and the low-priority channel are uplink channels. The higher layer processor is also configured to drop at least a portion of the low-priority uplink channel. The UE also includes transmitting circuitry configured to transmit the high-priority channel.

3 Claims, 19 Drawing Sheets

CHANNEL DROPPING BEHAVIOR AND TIMING RELATIONSHIPS FOR UPLINK CHANNEL COLLISION WITH DIFFERENT PRIORITIES

CROSS REFERENCE

This Nonprovisional application claims priority under 35 U.S.C. § 119 on provisional Application No. 62/932,287 on Nov. 7, 2019, the entire contents of which are hereby incorporated by reference.

TECHNICAL FIELD

The present disclosure relates generally to communication systems. More specifically, the present disclosure relates to channel dropping behavior and timing relationships for uplink channel collision with different priorities.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprises: a higher layer processor configured to determine that a transmission of a first uplink channel with high-priority overlaps in time with a transmission of a second uplink channel with low-priority, where the uplink channel may be a PUCCH or a PUSCH; the higher layer processor configured to drop the second uplink channel with low-priority; and transmitting circuitry configured to transmit the first uplink channel with high-priority.

In one example, a base station (gNB), comprises: a higher layer processor configured to determine that a transmission of a first uplink channel with high-priority overlaps in time with a transmission of a second uplink channel with low-priority, where the uplink channel may be a PUCCH or a PUSCH; the higher layer processor configured to drop the second uplink channel with low-priority; and receiving circuitry configured to receive the first uplink channel with high-priority.

In one example, a method by a user equipment (UE), comprises: determining that a transmission of a first uplink channel with high-priority overlaps in time with a transmission of a second uplink channel with low-priority, where the uplink channel may be a PUCCH or a PUSCH; dropping the second uplink channel with low-priority; and transmitting the first uplink channel with high-priority.

In one example, a method by a base station (gNB), comprises: determining that a transmission of a first uplink channel with high-priority overlaps in time with a transmission of a second uplink channel with low-priority, where the uplink channel may be a PUCCH or a PUSCH; dropping the second uplink channel with low-priority; and receiving the first uplink channel with high-priority.

DESCRIPTION OF EMBODIMENTS

Figure 1:
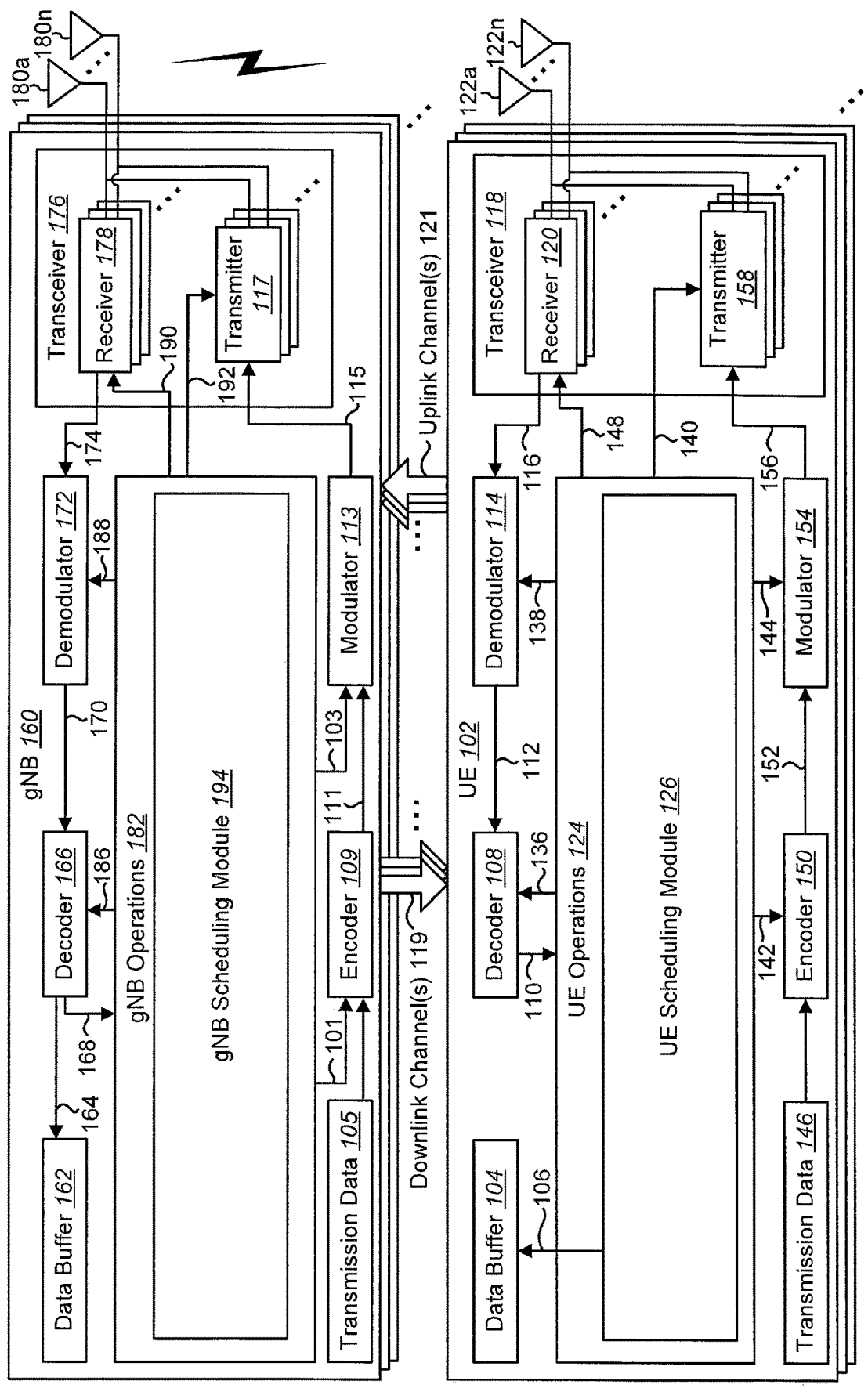
FIG. 1 is a block diagram illustrating one implementation of one or more base stations (gNBs) and one or more user equipments (UEs) in which systems and methods in which channel dropping behavior and timing relationships for uplink channel collision with different priorities may be implemented.

A user equipment (UE) is described that includes a higher layer processor configured to determine that a high-priority channel collides with a low-priority channel. The high-priority channel and the low-priority channel are uplink channels. The higher layer processor is also configured to drop at least a portion of the low-priority uplink channel. The UE also includes transmitting circuitry configured to transmit the high-priority channel.

In one approach, if the high-priority channel starts at a same symbol as the low-priority channel or the high-priority channel starts earlier than the low-priority channel, the low-priority channel may be fully dropped without transmission, and only the high-priority channel is transmitted.

In another approach, if a starting symbol of a low-priority channel is earlier than a high-priority channel, the high-priority channel may puncture the low-priority channel from an overlapping symbol.

In yet another approach, if a starting symbol of a low-priority channel is earlier than a high-priority channel, the low-priority channel may be fully dropped or punctured by the high-priority channel based on a timing relationship. In one example, if channel status or transmission of the high-priority channel is known before the start of the low priority transmission, the low-priority channel may be fully dropped without transmission, and only the high-priority channel is transmitted. In another example, if the low-priority channel transmission is already started, the high-priority channel may puncture the ongoing low-priority channel.

If the high-priority channel is configured with subslot structure, the high-priority channel may be assumed to be known before a subslot that contains the high-priority channel. In another example, the timing that transmission of the high-priority channel is known may be determined by uplink control information (UCI) or channel type.

A base station (gNB) is also described. The gNB includes a higher layer processor configured to determine that a high-priority channel collides with a low-priority channel, the high-priority channel and the low-priority channel being uplink channels. The higher layer processor is also configured to drop at least a portion of the low-priority uplink channel. The gNB also includes receiving circuitry configured to receive the high-priority channel.

A method by a user equipment (UE) is also described. The method includes determining that a high-priority channel collides with a low-priority channel, the high-priority channel and the low-priority channel being uplink channels. The method also includes dropping at least a portion of the low-priority uplink channel. The method further includes transmitting the high-priority channel.

A method by a base station (gNB) is also described. The method includes determining that a high-priority channel collides with a low-priority channel, the high-priority channel and the low-priority channel being uplink channels. The method also includes dropping at least a portion of the low-priority uplink channel. The method further includes receiving the high-priority channel.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

For intra-UE collision handling at the physical (PHY) layer, in the case that a high-priority uplink (UL) transmission overlaps with a low-priority UL transmission, the low-priority UL transmission may be dropped under certain constraints (particularly timeline). In some implementations, the UL transmission may be a positive scheduling request (SR), HARQ-ACK, PUSCH or a P/SP-CSI on PUCCH. Other types of UL transmission may include SRS, PRACH, PUCCH-BFR, etc.

Various examples of dropping behaviors are described herein. Examples of processing timeline issues are also described herein.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more base stations (gNBs) and one or more user equipments (UEs) in which systems and methods in which channel dropping behavior and timing relationships for uplink channel collision with different priorities may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform channel dropping behavior and timing relationships for uplink channel collision with different priorities as described herein.

In NR, different service types are supported (e.g., enhanced mobile broadband (eMBB) and ultra-reliable and low latency (URLLC)). To support different service types, at least two HARQ-ACK codebooks are simultaneously constructed for different service types. For channel collision handling, a two-level priority is known at the PHY layer for each PHY channel transmission. For different service types between eMBB and URLLC, a channel with eMBB data or eMBB UCI feedback is considered as low priority, and a channel with URLLC data or URLLC UCI feedback is considered as high priority. The priority of a channel is known at the PHY layer by explicit signaling in physical layer or high layer as described below.

For a positive SR, the two level SR priority is known at PHY layer, indicated explicitly in RRC configuration for SR resource. Specifically, a SR configured for an URLLC traffic has a high priority, and a SR configured for an eMBB traffic has low priority. Thus, the SR PUCCH resources for URLLC and eMBB may have different PUCCH configurations and parameters, e.g. power control, BLER requirements, etc.

For dynamically grant PUSCH, the two-level priority is known at PHY layer by physical layer indication and/or signaling (e.g., different RNTI, different DCI formats, or new bit in a scheduling DCI). For a configured grant PUSCH, the two-level priority may be determined by an explicit indication (as a new RRC parameter) in each configured grant (CG) configuration for Type 1 and Type 2 CG PUSCH. A PUSCH for URLLC traffic has a high priority, and a PUSCH for eMBB traffic has a low priority.

The priority for a HARQ-ACK codebook on a PUCCH or PUSCH may be determined by the corresponding PDSCH. The two-level priority of a scheduled PDSCH transmission can be determined by physical layer indication and/or signaling (e.g., different RNTI, different DCI formats, or new bit in a scheduling DCI). The two-level priority of an SPS PDSCH transmission can be determined by an explicit indication (as a new RRC parameter) in each SPS PDSCH configuration provides mapping to corresponding HARQ-ACK codebook for SPS PDSCH and ACK for SPS PDSCH release. Thus, a HARQ-ACK feedback or codebook for a PDSCH with URLLC traffic has a high priority, and a HARQ-ACK feedback or codebook for a PDSCH with eMBB traffic has a low priority.

Periodic CSI or semi-persistent CSI (P/SP-CSI) on PUCCH may be treated with low priority. Thus, a PUCCH carrying P/SP-CSI has low priority even if the CSI is for URLLC CSI report. The priority of a semi-persistent CSI SP-CSI on PUSCH depends on the 2-level PHY priority of the PUSCH conveying the SP-CSI. The priority of an aperiodic CSI (A-CSI) depends on the 2-level PHY priority of the PUSCH (with or without UL-SCH) conveying the A-CSI.

For a UE that supports different service types, a high-priority uplink channel may be an uplink channel carrying URLLC data or URLLC UCI, and a low-priority uplink channel may be an uplink channel carrying eMBB data or eMBB UCI. For intra-UE collision handling at the PHY layer, in the case that a high-priority UL transmission overlaps with a low-priority UL transmission, the low-priority UL transmission may be dropped under certain constraints (particularly timeline), at least for UL transmissions including a positive SR, HARQ-ACK, PUSCH or P/SP-CSI on PUCCH. Therefore, in some examples, in the case of channel collision between the same priority, Rel-15 handling methods can be reused.

In the case of channel collision between different priorities, the high-priority channel may be transmitted, and the low-priority channel may be dropped. Thus, in a case that a URLLC UL channel collides with an eMBB UL channel, the URLLC UL channel is transmitted, and the eMBB channel may be dropped. However, the detailed dropping behaviors still need to be further defined based on timing restrictions.

Dropping behaviors for collision between channels with different priorities are described herein. Different overlapping conditions may occur between a high-priority channel and a low-priority channel. Especially, if the low-priority channel has a long duration, the low-priority channel transmission may already start before a high-priority channel arrives. This disclosure describes examples of dropping behavior under different timing conditions in the case of channel collision between different priorities.

Figure 17:
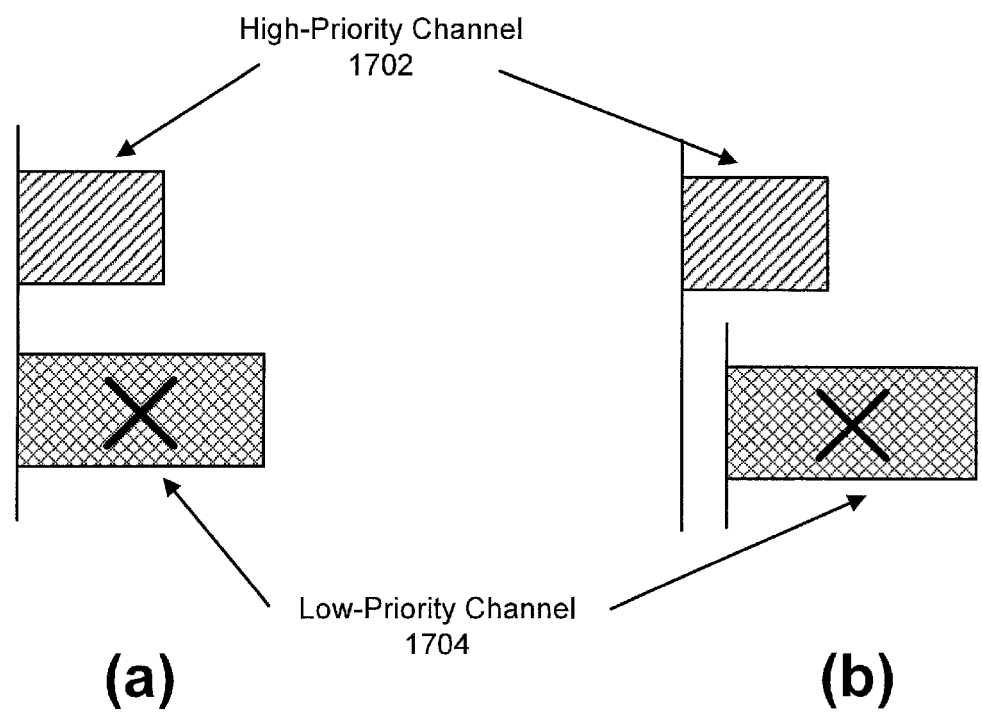
FIG. 17 illustrates examples of dropping behaviors for collision between channels with different priorities.

In a first case (Case 1), a high-priority channel transmission starts earlier than or at the same symbol as the low-priority channel. In this case, if the high-priority channel starts at the same symbol as the low-priority channel (FIG. 17a), or the high-priority channel starts earlier than the low-priority channel (FIG. 17b), the low-priority channel is fully dropped without transmission, and only the high-priority channel is transmitted, as shown in FIG. 17.

In a second case (Case 2), high-priority channel transmission starts after the low-priority channel. In this case, if the starting symbol of a low-priority channel is earlier than a high-priority channel, the channel dropping behaviors should be further discussed, and different methods may be considered depending on the timing restrictions, especially whether the high-priority channel transmission is known before the low-priority channel.

Figure 18:
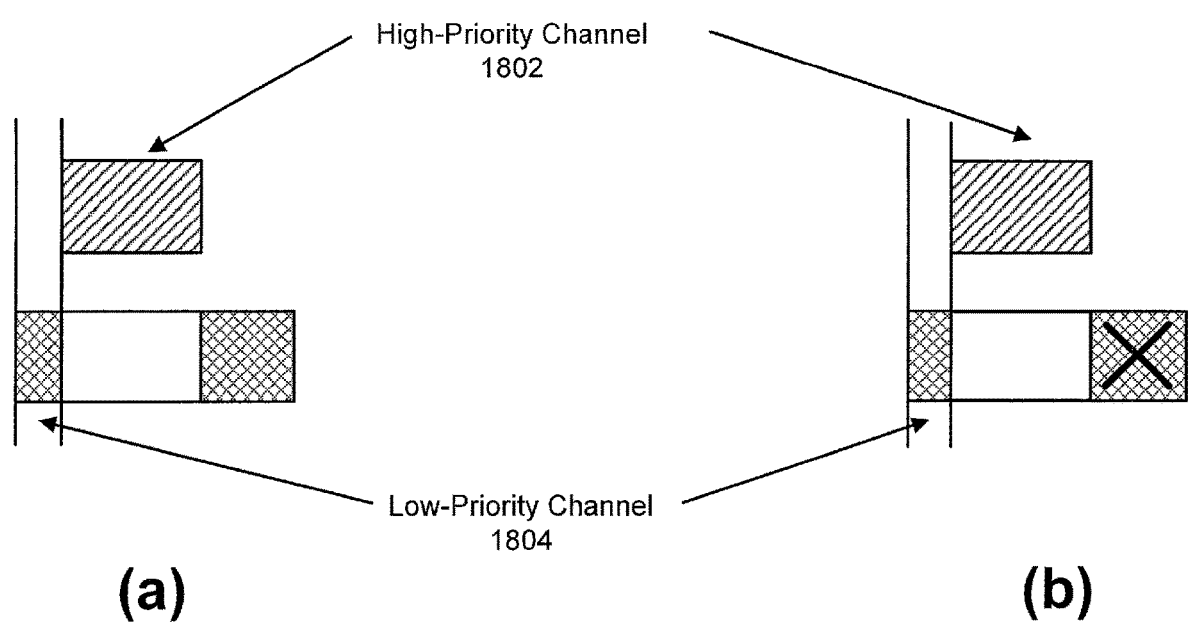
FIG. 18 illustrates other examples of dropping behaviors for collision between channels with different priorities.

In a first method (Method 1), the high-priority channel punctures the low-priority channel from the overlapping symbol. With this method, no extra timing relationship needs to be defined. The high-priority channel should preempt the transmission of a low-priority channel in all cases. Since the low-priority channel starts earlier than the high-priority channel, the low-priority channel transmission is already started when the high-priority channel arrives. Thus, the high-priority channel is transmitted by puncturing the low-priority channel from the overlapping symbol, as shown in FIG. 18.

In Method 1, the high-priority channel should puncture at least all overlapping symbols between the high-priority channel and the low-priority channel. If there are remaining symbol(s) on the low-priority channel after the high-priority channel transmission, in one approach, the remaining symbol(s) on the low-priority channel transmission are resumed and still transmitted (as shown in FIG. 18a). In another approach, the low-priority channel is not resumed after puncturing, thus the remaining symbol(s) on the low-priority channel transmission are also dropped (as shown in FIG. 18b). This approach may provide a simpler solution assuming the low-priority channel is dropped and not be recovered or detected.

In a second method (Method 2), depending on the timing relationships, the low-priority channel may be fully dropped, or may be punctured by the high-priority channel. The timing relationships may include the processing time for a PDSCH or PUSCH scheduling, the UE capabilities of DCI decoding, the buffer status for a SR triggering, etc. The channels with different priorities may be configured with the same or different frame structures.

In one case, the high-priority channels (e.g., PUCCH or PUSCH) may be configured at subslot level, and low-priority channel may be configured at slot level.

In another case, the channels with different priorities may be configured with the same or different slot or subslot granularity. In one example, both the high-priority channel and low-priority channel are configured at slot level, which is especially useful for carriers with high subcarrier spacing (SCS) settings. In another example, both the high-priority channel and low-priority channel are configured at subslot level. In this example, the priority of a channel is indicated dynamically by DCI or semi-statically by RRC signaling. In another example, the high-priority channel and low-priority channel are configured with different subslot structures, e.g. an eMBB service is configured with a 7-symbol subslot and an URLLC service is configured with a 2-symbol subslot. In all cases, the priority of a channel is indicated dynamically by DCI or semi-statically by RRC signaling.

In all cases, out of order operation is critical for support different service types, e.g. eMBB and URLLC operations, in the same UE. The different processing capabilities may be specified for different service types. Or the same processing capability can be applied for all service types. In the case of same processing capability, the higher UE capability of a short processing time for URLLC can be applicable to eMBB traffic as well.

For the case of collision between a low-priority channel with a starting symbol that is earlier than a high-priority channel, the timing conditions for the high-priority channel should be clarified for when the status of the transmission of the high-priority channel is known to the UE. Depending on the type of UCI or data carried on a PHY channel, the status and channel transmission may be determined differently.

For a HARQ-ACK feedback of a PDSCH transmission, a PDSCH to HARQ-ACK timing may be used to determine the number of slots or subslots from the PDSCH transmission to the corresponding HARQ-ACK feedback. This time includes the DCI reception, DCI decoding, PDSCH reception, PDSCH decoding and preparation for the HARQ-ACK transmission. For SPS PDSCH, there is no dynamic DCI for the PDSCH transmission, since a PDSCH-to-HARQ-ACK timing should also be configured in the SPS configuration, the UE also knows if there is a HARQ-ACK feedback required based on a SPS PDSCH transmission.

On the other hand, the HARQ-ACK transmission can be scheduled by the UE if the PDSCH scheduling DCI is correctly decoded. Assuming the DL scheduling DCI processing time is N1 symbols after the scheduling DCI and scheduled PDSCH transmission, the HARQ-ACK feedback is known after the PDSCH scheduling DCI is processed and correctly decoded. For SPS PDSCH transmission, the HARQ-ACK feedback is known after the SPS PDSCH transmission is detected.

Similarly, for a dynamic grant PUSCH transmission, a scheduling timing k2 is used to determine the number of slots or subslots for the PUSCH transmission after the scheduling DCI. This time includes the DCI reception, DCI decoding, and preparation of PUSCH transmission.

On the other hand, the PUSCH transmission is known by the UE if the PUSCH scheduling DCI is correctly decoded. Assuming the UL scheduling DCI processing time is N2 symbols after the scheduling DCI transmission, the PUSCH transmission is known after the PUSCH scheduling DCI is processed and correctly decoded.

For activated configured grant (CG) PUSCH transmissions, the transmission time is scheduled in advance. In one method, the UE may always assume the transmission will occur at the configured PUSCH resources. On the other hand, the UE may not transmit the CG PUSCH if there is no data in the buffer for the given traffic. Thus, whether the PUSCH transmission occurs depends on whether there is data in the buffer for the traffic with the given service type.

The positive SR status is similar as the CG PUSCH transmission, a positive SR with a certain priority is triggered if the UE has data to be transmitted in the traffic of a given service type. At the PHY layer, a positive SR may be known from immediately after the previous SR PUCCH resource to immediately before the next configured SR PUCCH resource of the configured traffic.

Thus, for channel collision of different priorities, when the low-priority channel arrives earlier than the high-priority channel, the UCI or data content of the channels should be considered. Especially, the processing time and UE capabilities of high-priority channel (e.g., channel carrying data or UCI for URLLC) should be used to determine whether the high-priority channel status or transmission is known before the low-priority channel transmission. Different low-priority channel dropping behaviors may be applied based on timing conditions between the low priority and the high-priority channels.

Figure 19:
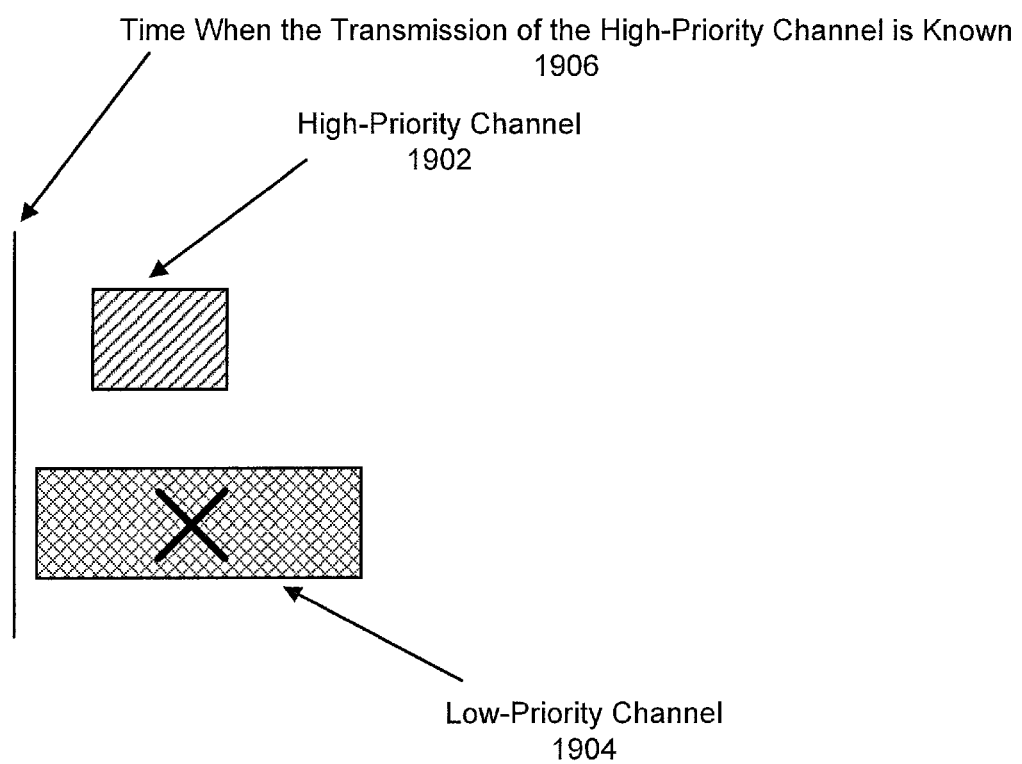
FIG. 19 illustrates another example of dropping behaviors for collision between channels with different priorities.

In a first subcase (Subcase 1), if the channel status of the transmission of the high-priority channel is known before the start of the low-priority transmission, the low-priority channel is fully dropped without transmission, and only the high-priority channel is transmitted. Thus, if the transmission of the high-priority channel is known before the start of the low-priority transmission, the low-priority channel can be dropped without transmission, and only the high-priority channel is transmitted, as shown in FIG. 19.

As an extension of Method 1, if the high-priority channel is configured at subslot level, the high-priority channel transmission is assumed to be known at the beginning of the subslot that contains the high-priority transmission. Thus, if the low-priority channel starts within the subslot that contains the high-priority channel, the low-priority channel should be fully dropped, and only the high-priority channel is transmitted. To be more specific, the status of the transmission of the high-priority channel may be known with different time constraints depending the UCI or data carried on the high-priority channel.

For high-priority HARQ-ACK on PUCCH of a SPS PDSCH transmission with high priority or a dynamic scheduled PDSCH transmission with high priority, in one method, if the PUCCH is configured at subslot level, the HARQ-ACK transmission can be assumed to be known at the beginning of the subslot that contains the PUCCH for HARQ-ACK reporting. Thus, if the low-priority channel starts within the subslot that contains the PUCCH for HARQ-ACK reporting, the low-priority channel should be fully dropped, and only the high-priority channel is transmitted. Note that if the PUCCH is configured at slot level, the PUCCH transmission for HARQ-ACK may be assumed to be known at the beginning of the slot that contains the PUCCH for HARQ-ACK reporting. Since all PHY channels cannot cross a slot boundary, the low-priority channel should be fully dropped in the slot, and only the high-priority channel is transmitted.

In another method, the status is assumed to be known after the DCI detection in the case of dynamically scheduled PDSCH or after the SPS PDSCH transmission is detected. Depending on the UE capability and processing time, the HARQ-ACK reporting may be known N1 symbols after the PDSCH transmission. In this case, if the low-priority channel starts from or after N1 symbols after the PDSCH transmission, the low-priority channel may be fully dropped without transmission and only the high-priority channel is transmitted.

Similarly, for a dynamic grant high-priority PUSCH transmission, in one method, if the high-priority PUSCH is configured at subslot level, the PUSCH transmission can be assumed to be known at the beginning of the subslot that contains the scheduled PUSCH transmission. Thus, if the low-priority channel starts within the subslot that contains the high-priority PUSCH transmission, the low-priority channel should be fully dropped, and only the high-priority channel is transmitted. Note that if the high-priority PUSCH is configured at slot level, the high-priority PUSCH transmission may be assumed to be known at the beginning of the slot that contains the high-priority PUSCH. Since all PHY channels cannot cross a slot boundary, the low-priority channel should be fully dropped in the slot, and only the high-priority channel is transmitted.

In another method, the PUSCH transmission is assumed to be known after the UL scheduling DCI detection. Depending on the UE capability and processing time, the HARQ-ACK reporting may be known N2 symbols after the UL scheduling DCI transmission. In this case, if the low-priority channel starts from or after N2 symbols after the UL scheduling DCI transmission, the low-priority channel may be fully dropped without transmission and only the high-priority channel is transmitted.

For a CG PUSCH transmission with high priority, the transmission is known at the UE if there is data in the buffer of the CG transmission. Thus, if there is data in the buffer of the CG transmission before the low-priority channel starts, the low-priority channel should be fully dropped, and only the high-priority channel is transmitted. On the other hand, the CG PUSCH may not occur if there no data in the buffer of the CG transmission. Thus, if there is no data in the buffer of the CG transmission before the low-priority channel starts, the low-priority channel should start as scheduled. If data arrives after the start of low-priority channel, the high-priority CG PUSCH channel should be transmitted by puncturing the ongoing low-priority channel, as described in subcase 2 below.

For a high priority SR, a positive SR is known at the UE if there are data in the buffer of the high-priority traffic before the SR PUCCH resource. Thus, if there is data in the buffer of the high-priority traffic before the low-priority channel starts, the low-priority channel should be fully dropped, and only the high-priority positive SR PUCCH channel is transmitted. On the other hand, the high-priority SR may be negative and SR PUCCH transmission may not occur if there no data in the buffer of the high priority traffic. Thus, if there is no data in the buffer of the high-priority traffic before the low-priority channel starts, the low-priority channel should start as scheduled. If data arrives after the start of low-priority channel, the high-priority positive SR PUCCH channel should be transmitted by puncturing the ongoing low-priority channel, as described in subcase 2 below.

In a second subcase (Subcase 2), if the low-priority channel transmission is already started, the high-priority channel should puncture the ongoing low-priority channel. If the status or transmission of the high-priority channel is not known before the low priority transmission, low-priority channel transmission is already started when the transmission of high-priority channel starts. In this case, the high-priority channel should puncture the ongoing low-priority channel. However, the detailed puncturing behaviors should be further clarified (e.g., the starting symbol for the puncturing, and the behavior after the puncturing).

Some examples of puncture behaviors are discussed below, and several approaches can be considered. In one approach, the high-priority channel is transmitted by puncturing the low-priority channel from the overlapping symbol, which is the same as Method 1 above. The high-priority channel should puncture at least all overlapping symbols between the high-priority channel and the low-priority channel. If there are remaining symbol(s) on the low-priority channel after the high priority transmission, in one approach, the remaining symbol(s) on the low-priority channel transmission are also dropped (as shown in FIG. 20a). This provides a simpler solution assuming the low-priority channel is dropped and not be recovered or detected. In another approach, the remaining symbol(s) on the low-priority channel transmission are resumed and still transmitted.

In another approach, the high-priority channel can puncture the low-priority channel from the symbol when the transmission of the high-priority channel is known at the UE (as shown in FIG. 20b). As a simple extension of Method 1, if the high-priority channel is configured at subslot level, the high-priority channel transmission is assumed to be known at the beginning of the subslot that contains the high-priority transmission. Thus, if the low-priority channel starts before the subslot that contains the high-priority channel, the low-priority channel can be punctured from the subslot that contains the high-priority channel. And the high-priority channel is transmitted as scheduled. To be more specific, the status of the transmission of the high-priority channel may be known with different time constraints depending the UCI or data carried on the high-priority channel.

For high-priority HARQ-ACK on PUCCH of a SPS PDSCH transmission with high priority or a dynamic scheduled PDSCH transmission with high priority, in one method, if the PUCCH is configured at subslot level, the HARQ-ACK transmission can be assumed to be known at the beginning of the subslot that contains the PUCCH for HARQ-ACK reporting. Thus, if the low-priority channel transmission already starts, the low-priority channel may be punctured from the beginning of the subslot that contains the high-priority channel carrying high priority HARQ-ACK. And the high-priority channel is transmitted as scheduled. Note that if the PUCCH is configured at slot level, the PUCCH transmission for HARQ-ACK may be assumed to be known at the beginning of the slot that contains the PUCCH for HARQ-ACK reporting. Since all PHY channel cannot cross a slot boundary, the low-priority channel should be fully dropped in the slot, and only the high-priority channel is transmitted.

In another method, the status is assumed to be known after the scheduling DCI detection in the case of dynamically scheduled PDSCH or after the SPS PDSCH transmission is detected. Depending on the UE capability and processing time, the HARQ-ACK reporting may be known N1 symbols after the PDSCH transmission. In this case, if the low-priority channel already starts, it can be punctured by the high-priority channel from or after N1 symbols after the PDSCH transmission. And the high-priority channel is transmitted as scheduled.

Similarly, for dynamic grant high-priority PUSCH transmission, in one method, if the high-priority PUSCH is configured at subslot level, the PUSCH transmission can be assumed to be known at the beginning of the subslot that contains the scheduled PUSCH transmission. Thus, if the low-priority channel already starts, the low-priority channel may be punctured from the beginning of the subslot that contains the high-priority PUSCH. And the high-priority channel is transmitted as scheduled. Note that if the high-priority PUSCH is configured at slot level, the high-priority PUSCH transmission may be assumed to be known at the beginning of the slot that contains the high-priority PUSCH. Since all PHY channels cannot cross a slot boundary, the low-priority channel should be fully dropped in the slot, and only the high-priority channel is transmitted.

In another method, the PUSCH transmission is assumed to be known after the UL scheduling DCI detection. Depending on the UE capability and processing time, the HARQ-ACK reporting may be known N2 symbols after the UL scheduling DCI transmission. In this case, if the low-priority channel already starts, the low-priority channel may be punctured from or after N2 symbols after the UL scheduling DCI transmission and before the high-priority channel transmission. And the high-priority channel is transmitted as scheduled.

For a CG PUSCH transmission with high priority, if there is no data in the buffer of the CG transmission before the low-priority channel starts, the low-priority channel should start as scheduled. If data arrives after the start of low-priority channel, the high priority CG PUSCH channel should be transmitted by puncturing the ongoing low-priority channel. In one method, the low-priority channel is punctured from the overlapping symbol. In another method, the low-priority channel is punctured from a symbol when data arrives at the buffer for the CG PUSCH transmission. Note this may be any symbol after the start of low priority transmission and before the start of the high priority transmission depending on the data arrival time.

For a high priority SR, if there is no data in the buffer of the high priority traffic before the low-priority channel starts, the low-priority channel should start as scheduled. If high-priority data arrives after the start of low-priority channel, a high-priority positive SR PUCCH channel should be transmitted by puncturing the ongoing low-priority channel. In one method, the low-priority channel is punctured from the overlapping symbol. In another method, the low-priority channel is punctured from a symbol when data arrives at the buffer for the high-priority data. Note this may be any symbol after the start of low-priority transmission and before the start of the high-priority transmission depending on the data arrival time.

In all cases, if there are remaining symbol(s) on the punctured low-priority channel after the high-priority transmission, in one approach, the remaining symbol(s) on the low-priority channel transmission are also dropped (as shown in FIG. 20b). This provides a simpler solution assuming the low-priority channel is dropped and not to be recovered or detected. In another approach, the remaining symbol(s) on the low-priority channel transmission are resumed and still transmitted.

In NR with eMBB service only, timeline conditions are defined for UCI multiplexing in case of PUCCH collision. In the case that the timeline is not satisfied, it is treated as an error case. The same principles can be applied for channel collisions between the same service type (e.g., an URLLC PUCCH collides with another URLLC PUCCH or PUSCH).

For collision between channels with different priorities, timeline conditions can be used to determine the dropping or puncturing location of the low-priority channel. No timeline limitations should be defined as an error case. This is because the high-priority channel should preempt the low priority under any timeline condition. Fully drop of the low priority channel is preferred if the timeline can be satisfied that the upcoming high-priority channel transmission is known before the low-priority channel transmission starts. On the other hand, high-priority channel punctures of the low-priority channel still need to be supported when the timeline is not satisfied. The supported behavior of puncturing an ongoing low-priority channel is more important than the detailed puncturing position. At least the overlapping symbols should be punctured by the high-priority channel. In case of puncturing, the starting puncturing position of the low-priority channel may be flexible and different due to different UE capabilities or implementations. The details may be left as UE implementation issue because the punctured low priority channel may be viewed as destroyed or corrupted beyond detection or decoding.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform scheduling operations and resource allocation as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
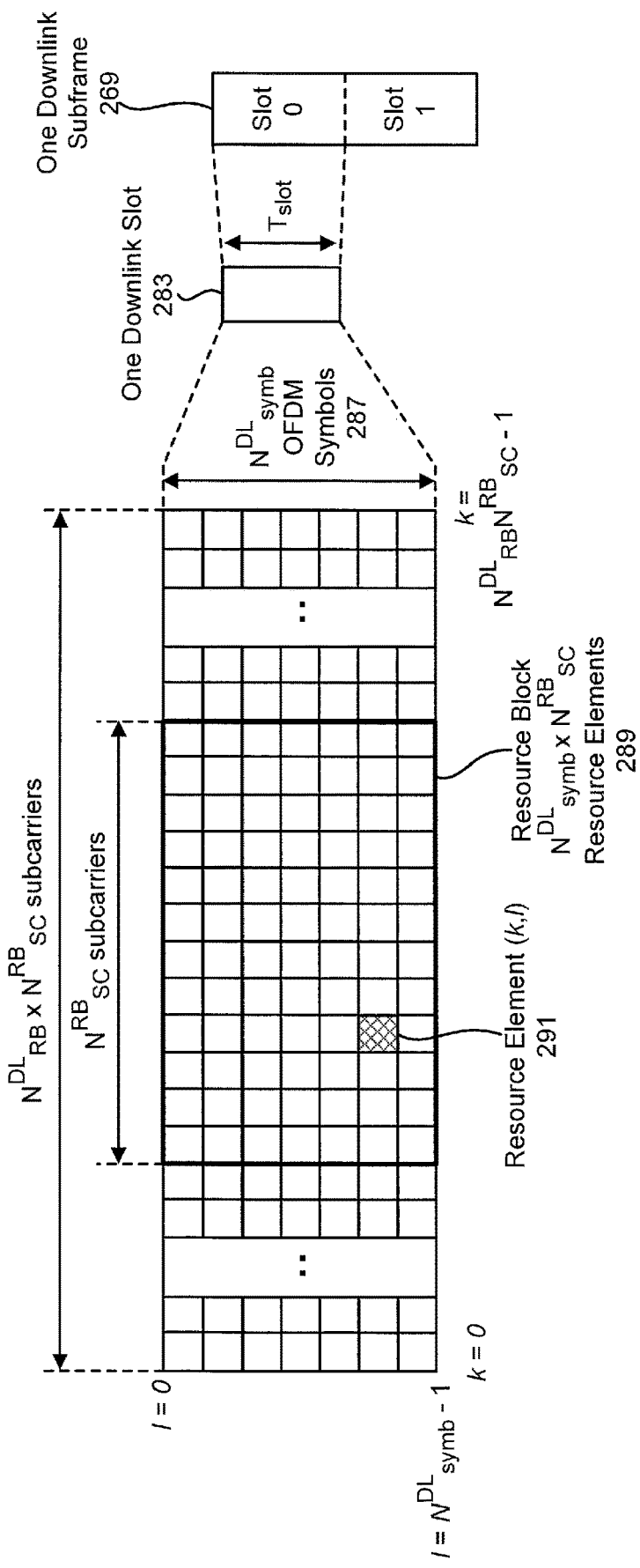
FIG. 2 is a diagram illustrating an example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 291 may be the RE 291 whose index l fulfils l≥$l_{data,start}$ and/or $l_{data,end}$≥l in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
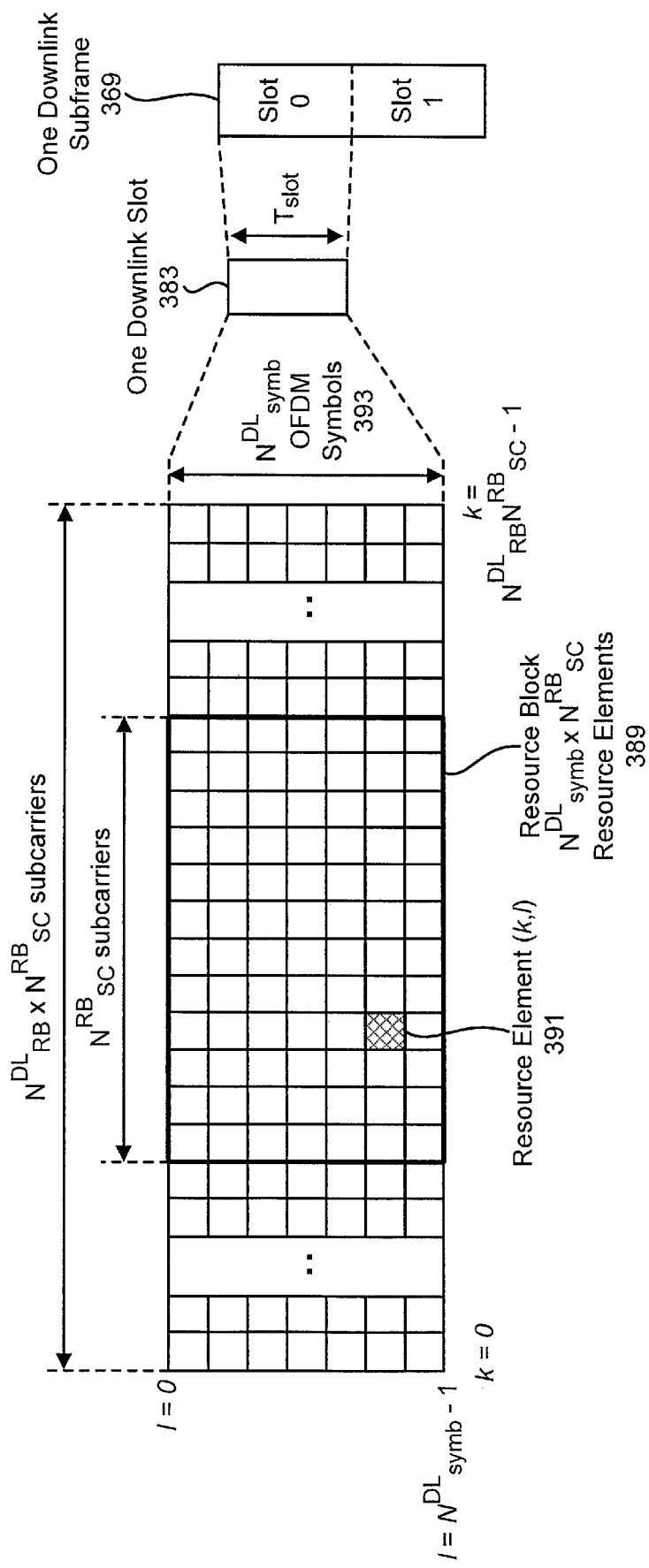
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
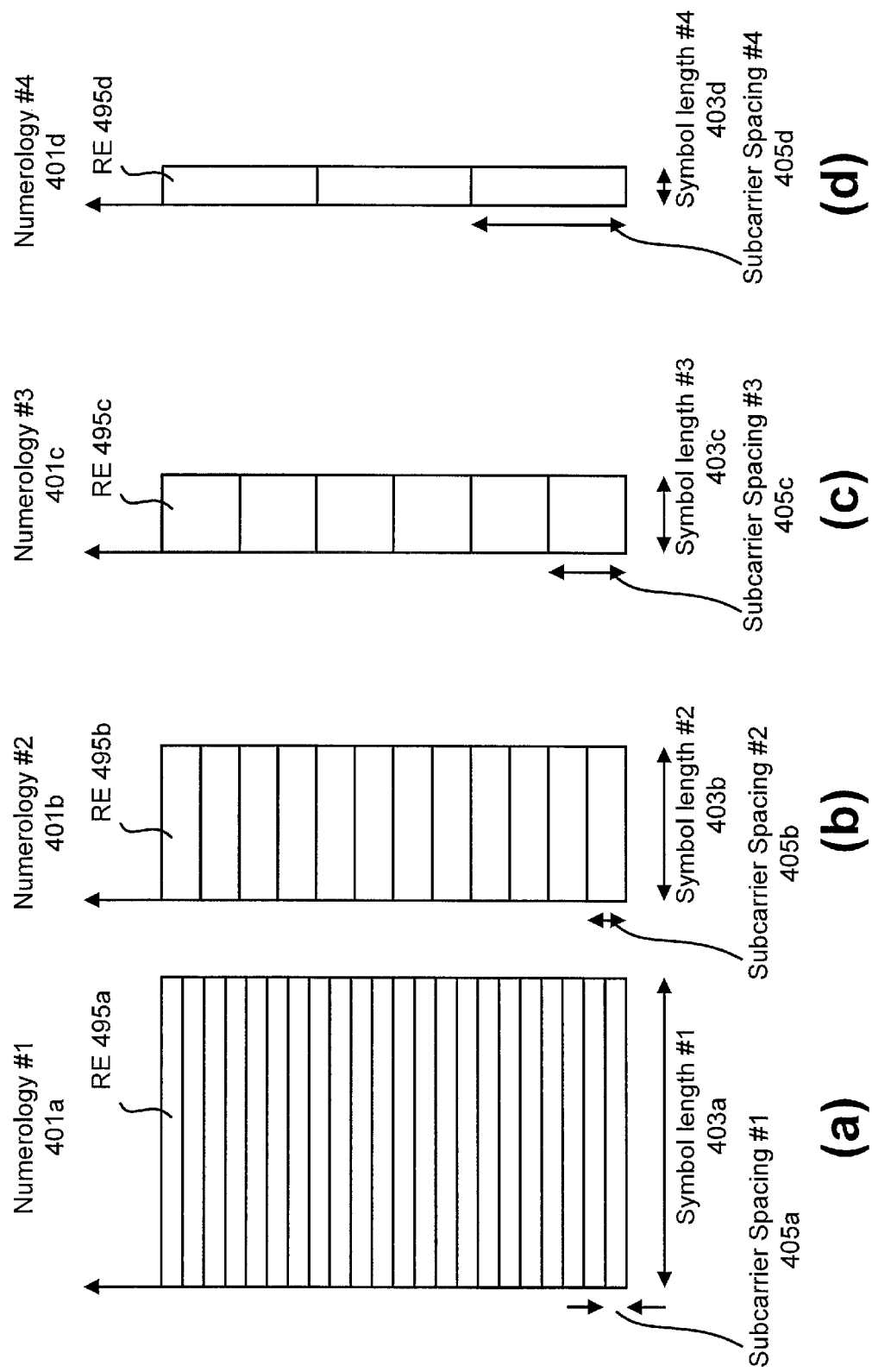
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
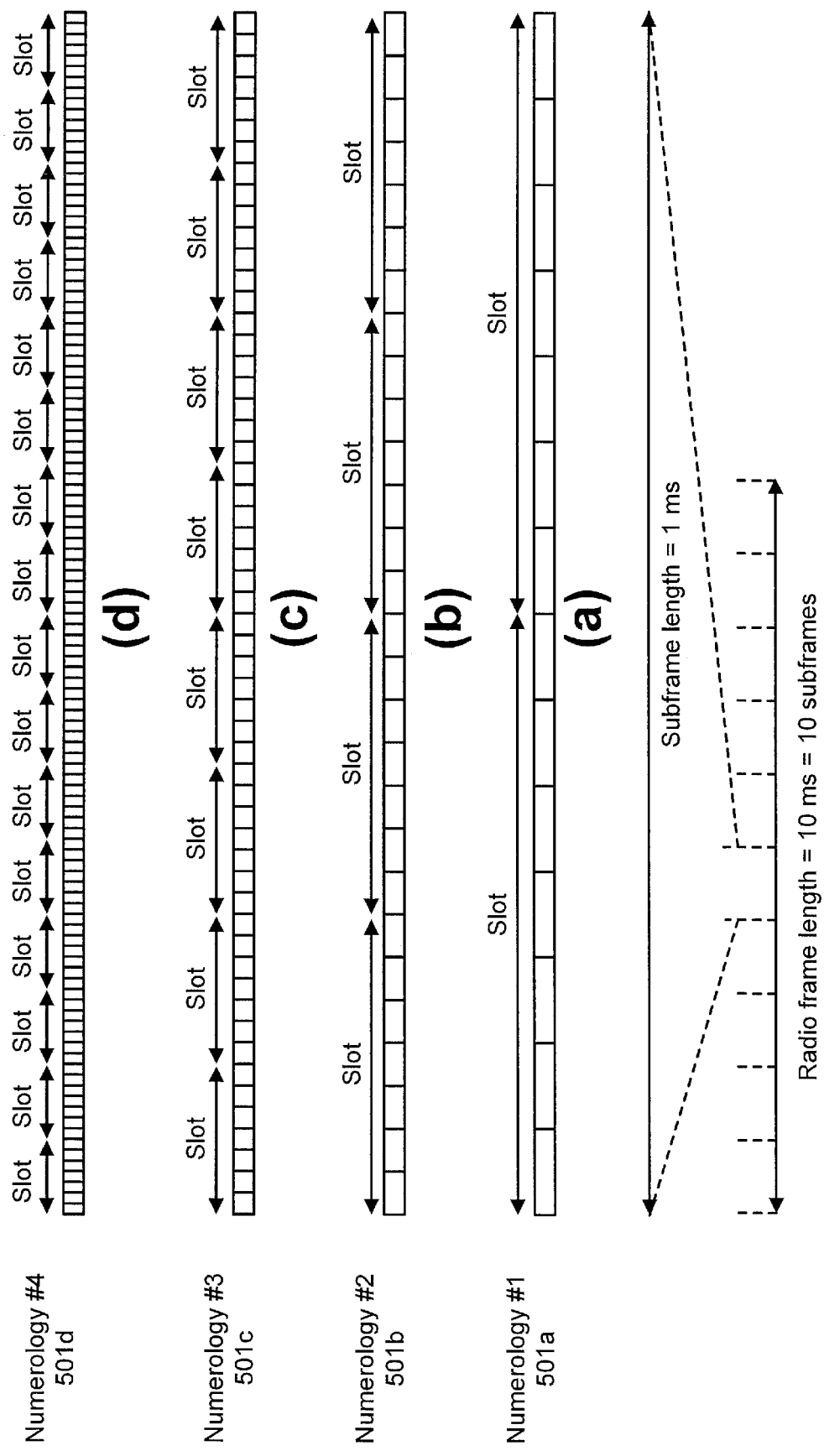
FIG. 5 shows examples of subframe structures for the numerologies that are shown in FIG. 4.

FIG. 5 shows examples of subframe structures for the numerologies 501 that are shown in FIG. 4. Given that a slot 583 includes $N^{DL}_{symb}$ (or $N^{UL}_{symb}$)=7 symbols, the slot length of the i+1-th numerology 501 is a half of the one for the i-th numerology 501, and eventually the number of slots 583 in a subframe (i.e., 1 ms) becomes double. It may be noted that a radio frame may include 10 subframes, and the radio frame length may be equal to 10 ms.

Figure 6:
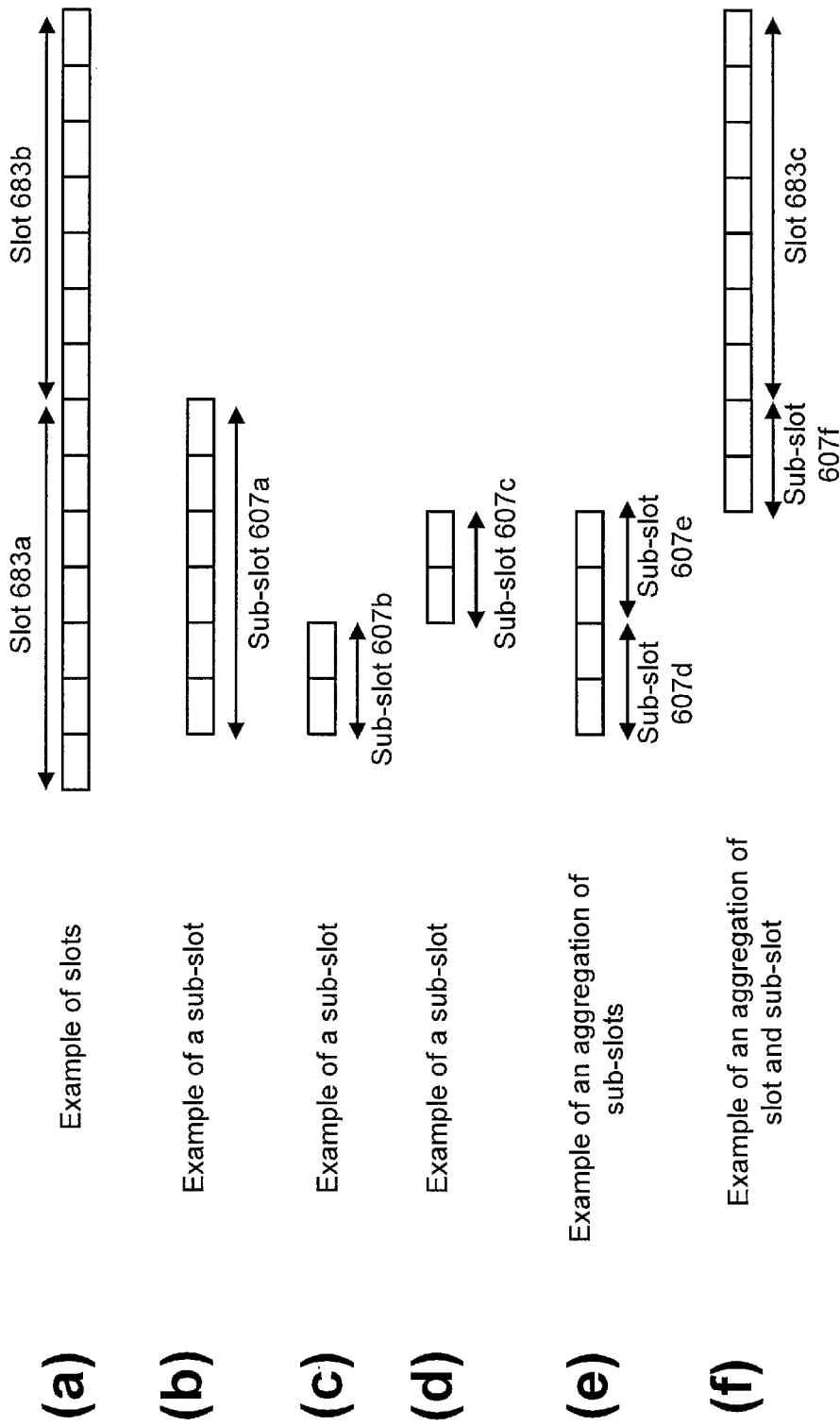
FIG. 6 shows examples of slots and subslots.

FIG. 6 shows examples of slots 683 and subslots 607. If a subslot 607 is not configured by higher layer, the UE 102 and the eNB/gNB 160 may only use a slot 683 as a scheduling unit. More specifically, a given transport block may be allocated to a slot 683. If the subslot 607 is configured by higher layer, the UE 102 and the eNB/gNB 160 may use the subslot 607 as well as the slot 683. The subslot 607 may include one or more OFDM symbols. The maximum number of OFDM symbols that constitute the subslot 607 may be $N^{DL}_{symb}-1$ (or $N^{UL}_{symb}-1$).

The subslot length may be configured by higher layer signaling. Alternatively, the subslot length may be indicated by a physical layer control channel (e.g., by DCI format).

The subslot 607 may start at any symbol within a slot 683 unless it collides with a control channel. There could be restrictions of mini-slot length based on restrictions on starting position. For example, the subslot 607 with the length of $N^{DL}_{symb}-1$ (or $N^{UL}_{symb}-1$) may start at the second symbol in a slot 683. The starting position of a subslot 607 may be indicated by a physical layer control channel (e.g., by DCI format). Alternatively, the starting position of a subslot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned subslot 607.

In cases when the subslot 607 is configured, a given transport block may be allocated to either a slot 683, a subslot 607, aggregated subslots 607 or aggregated subslot(s) 607 and slot 683. This unit may also be a unit for HARQ-ACK bit generation.

Figure 7:
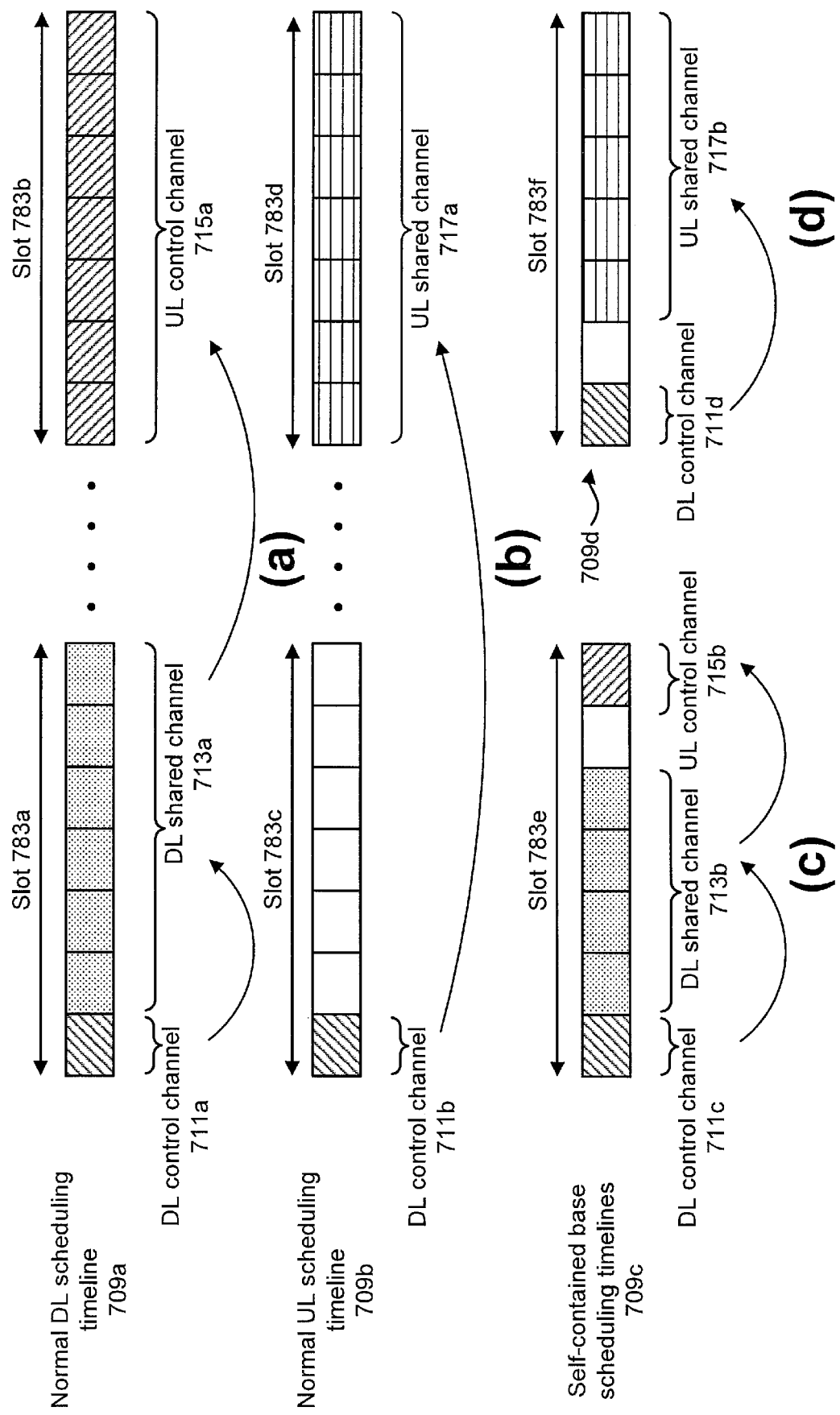
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709*b*, DL control channels 711*b* are mapped the initial part of a slot 783*c*. The DL control channels 711*b* schedule UL shared channels 717*a* in a later slot 783*d*. For these cases, the association timing (time shift) between the DL slot 783*c* and the UL slot 783*d* may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709*c*, DL control channels 711*c* are mapped to the initial part of a slot 783*e*. The DL control channels 711*c* schedule DL shared channels 713*b* in the same slot 783*e*. HARQ-ACKs for the DL shared channels 713*b* are reported in UL control channels 715*b*, which are mapped at the ending part of the slot 783*e*.

For a self-contained base UL scheduling timeline 709*d*, DL control channels 711*d* are mapped to the initial part of a slot 783*f*. The DL control channels 711*d* schedule UL shared channels 717*b* in the same slot 783*f*. For these cases, the slot 783*f* may contain DL and UL portions, and there may be a guard period between the DL and UL transmissions.

The use of a self-contained slot may be upon a configuration of self-contained slot. Alternatively, the use of a self-contained slot may be upon a configuration of the subslot. Yet alternatively, the use of a self-contained slot may be upon a configuration of shortened physical channel (e.g., PDSCH, PUSCH, PUCCH, etc.).

Figure 8:
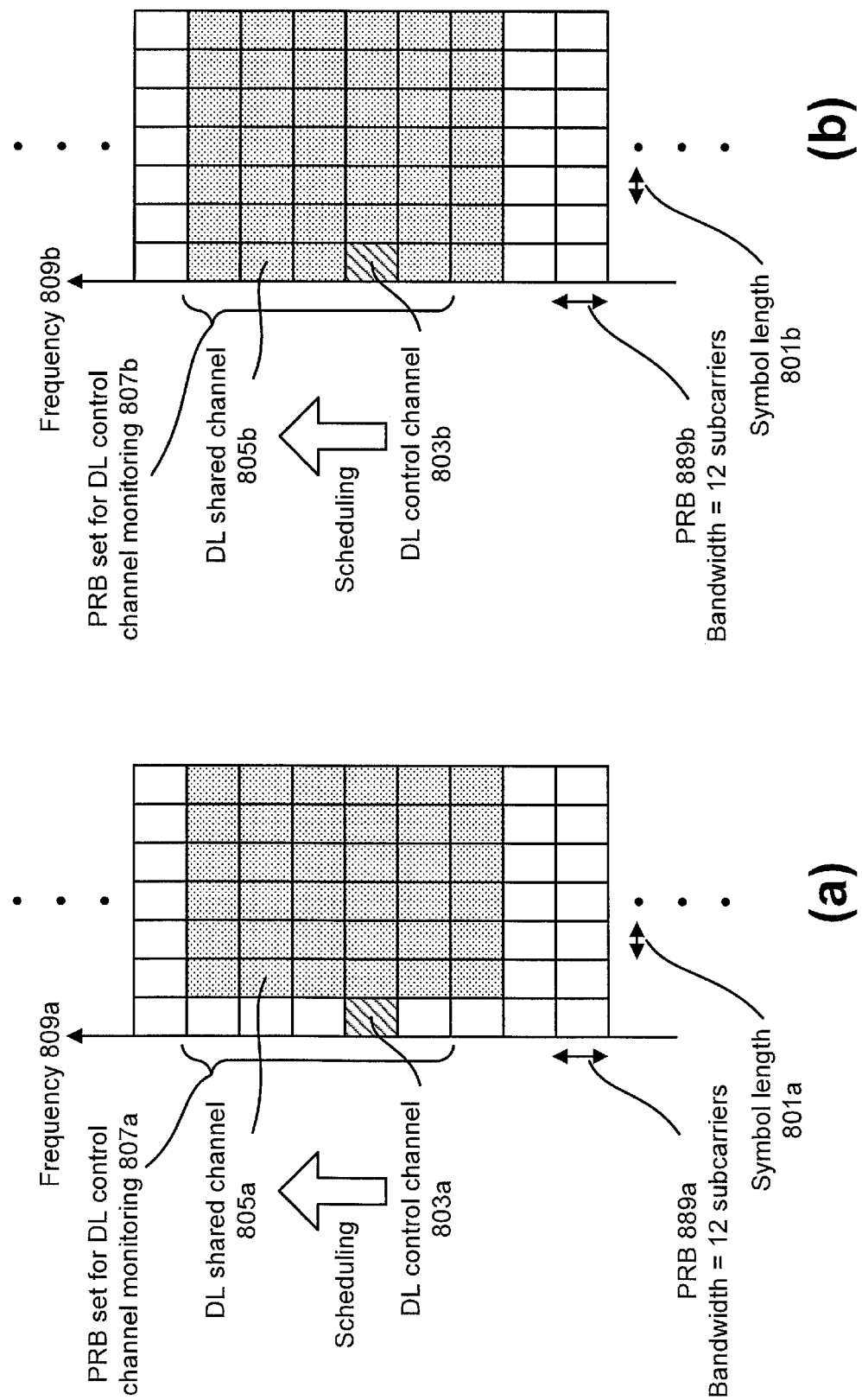
FIG. 8 shows examples of DL control channel monitoring regions.

FIG. 8 shows examples of DL control channel monitoring regions. In a first example (a), a physical resource block (PRB) 889*a* is shown with a symbol length 801*a* and frequency 809*a*. In a second example (a), a physical resource block (PRB) 889*b* is shown with a symbol length 801*b* and frequency 809*b*. In an implementation, the bandwidth of the PRB 889*a,b*.

In the examples of FIG. 8, one or more sets of PRB(s) 889 may be configured for DL control channel monitoring. In other words, a control resource set 807*a,b* is, in the frequency domain, a set of PRBs 889*a,b* within which the UE 102 attempts to blindly decode downlink control information, where the PRBs 889*a,b* may or may not be frequency contiguous. A UE 102 may have one or more control resource sets 807*a,b*, and one DCI message may be located within one control resource set 807*a,b*. In the frequency-domain, a PRB 889 is the resource unit size (which may or may not include Demodulation reference signals (DMRS)) for a control channel 803*a,b*. A DL shared channel 805*a,b* may start at a later OFDM symbol than the one(s) which carries the detected DL control channel 803*a,b*. Alternatively, the DL shared channel 805*a,b* may start at (or earlier than) an OFDM symbol than the last OFDM symbol which carries the detected DL control channel 803*a,b*. In other words, dynamic reuse of at least part of resources in the control resource sets 807*a,b* for data for the same or a different UE 102, at least in the frequency domain may be supported.

Figure 9:
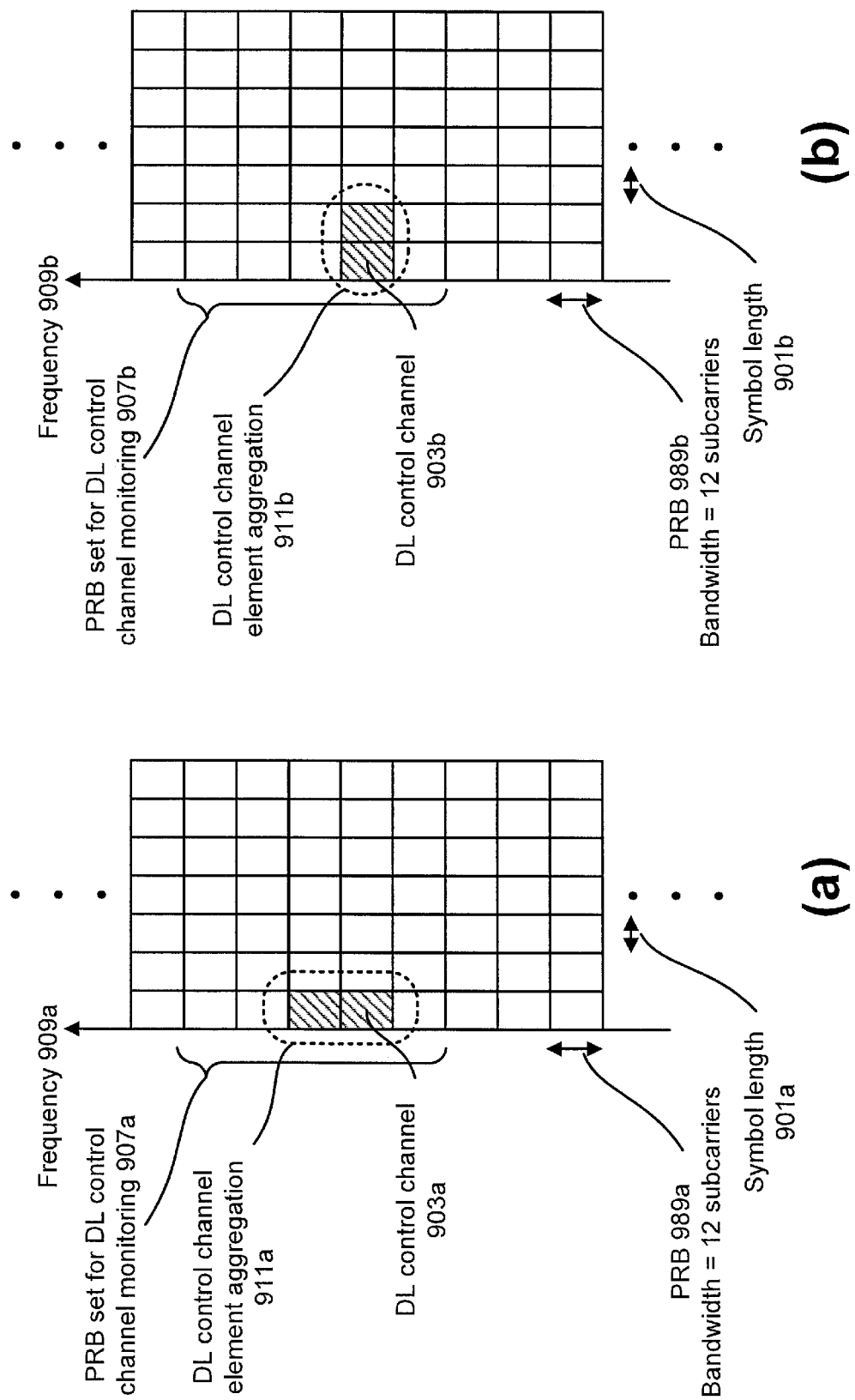
FIG. 9 shows examples of DL control channel which includes more than one control channel elements.

FIG. 9 shows examples of a DL control channel 903*a,b* which includes more than one control channel elements. In a first example (a), a physical resource block (PRB) 989*a* is shown with a symbol length 901*a* and frequency 909*a*. In a second example (a), a physical resource block (PRB) 989*b* is shown with a symbol length 901*b* and frequency 909*b*.

When the control resource set 907*a,b* spans multiple OFDM symbols, a control channel candidate may be mapped to multiple OFDM symbols or may be mapped to a single OFDM symbol. One DL control channel element 903*a,b* may be mapped on REs defined by a single PRB 989*a,b* and a single OFDM symbol. If more than one DL control channel elements 903*a,b* are used for a single DL control channel transmission, DL control channel element aggregation 911*a,b* may be performed.

The number of aggregated DL control channel elements 903*a,b* is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set 907*a,b*. If one DL control channel 903*a,b* is mapped to a single OFDM symbol and does not span multiple OFDM symbols, the DL control channel element aggregation is performed within an OFDM symbol, namely multiple DL control channel elements 903*a,b* within an OFDM symbol are aggregated. Otherwise, DL control channel elements 903*a,b* in different OFDM symbols can be aggregated.

Figure 10:
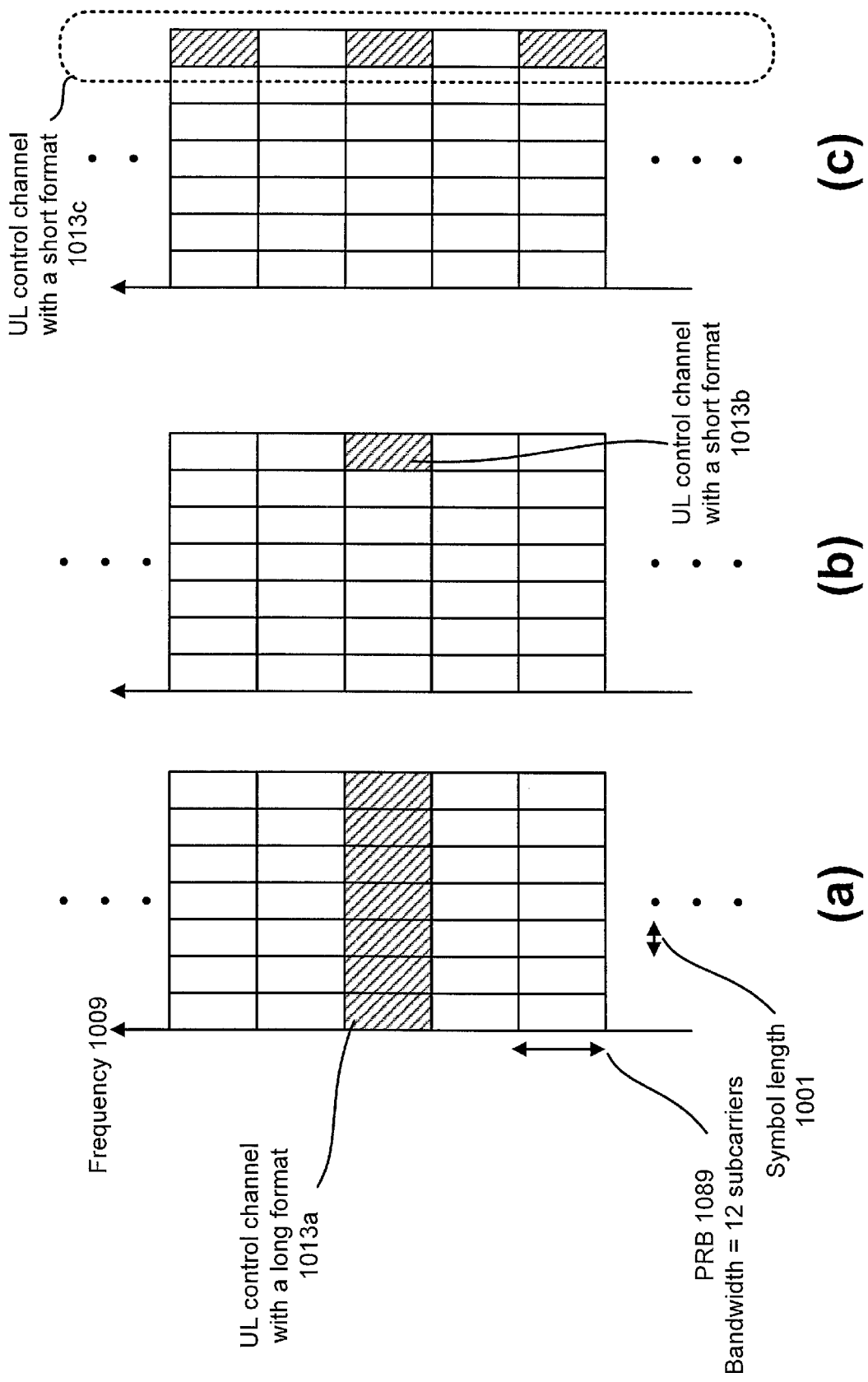
FIG. 10 shows examples of UL control channel structures.

FIG. 10 shows examples of UL control channel structures. In the examples of FIG. 10, physical resource blocks (PRBs) 1089 are shown with a symbol length 1001 and frequency 1009.

In a first example (a), the UL control channel 1013*a* may be mapped on REs which are defined by a PRB 1089 and a slot in frequency and time domains, respectively. This UL control channel 1013*a* may be referred to as a long format (or just the 1st format).

In the second example (b) and third example (c), UL control channels 1013*b,c* may be mapped on REs on a limited OFDM symbols in time domain. This may be referred to as a short format (or just the 2nd format). The UL control channels 1013*b,c* with a short format may be mapped on REs within a single PRB 1089. Alternatively, the UL control channels 1013*b,c* with a short format may be mapped on REs within multiple PRBs 1089. For example, interlaced mapping may be applied, namely the UL control channel 1013*b,c* may be mapped to every N PRBs (e.g., 5 or 10) within a system bandwidth.

Figure 11:
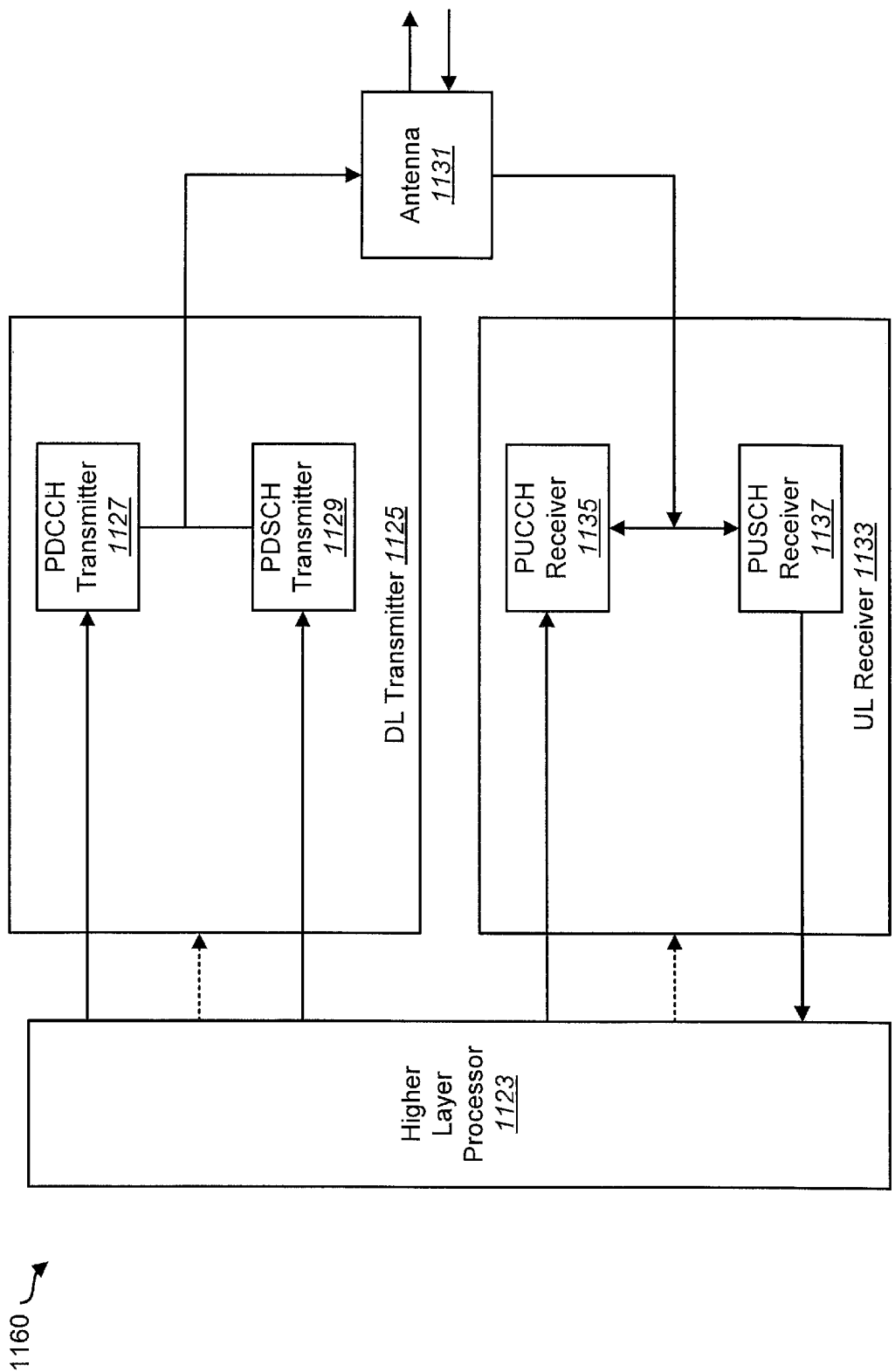
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
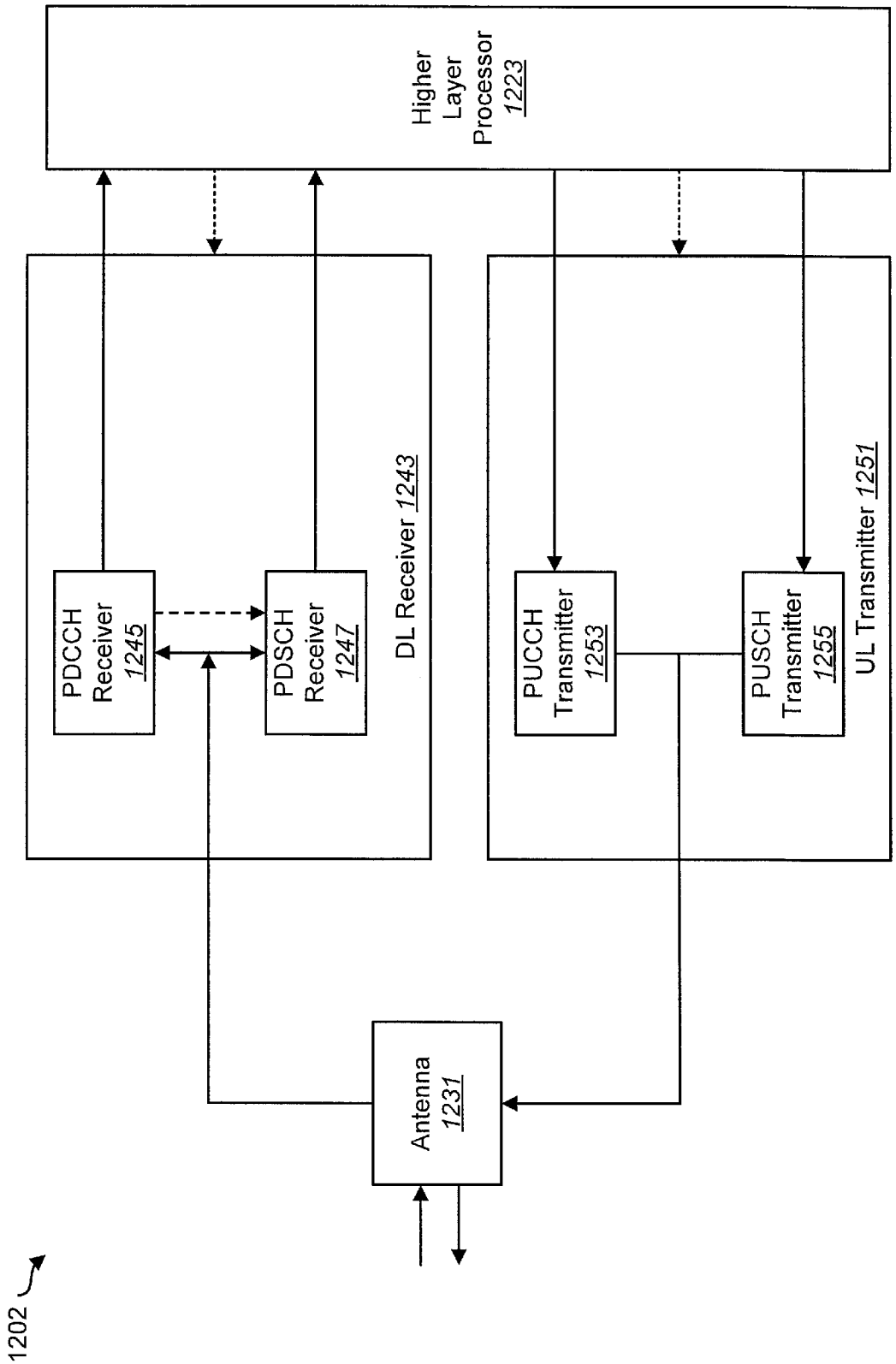
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
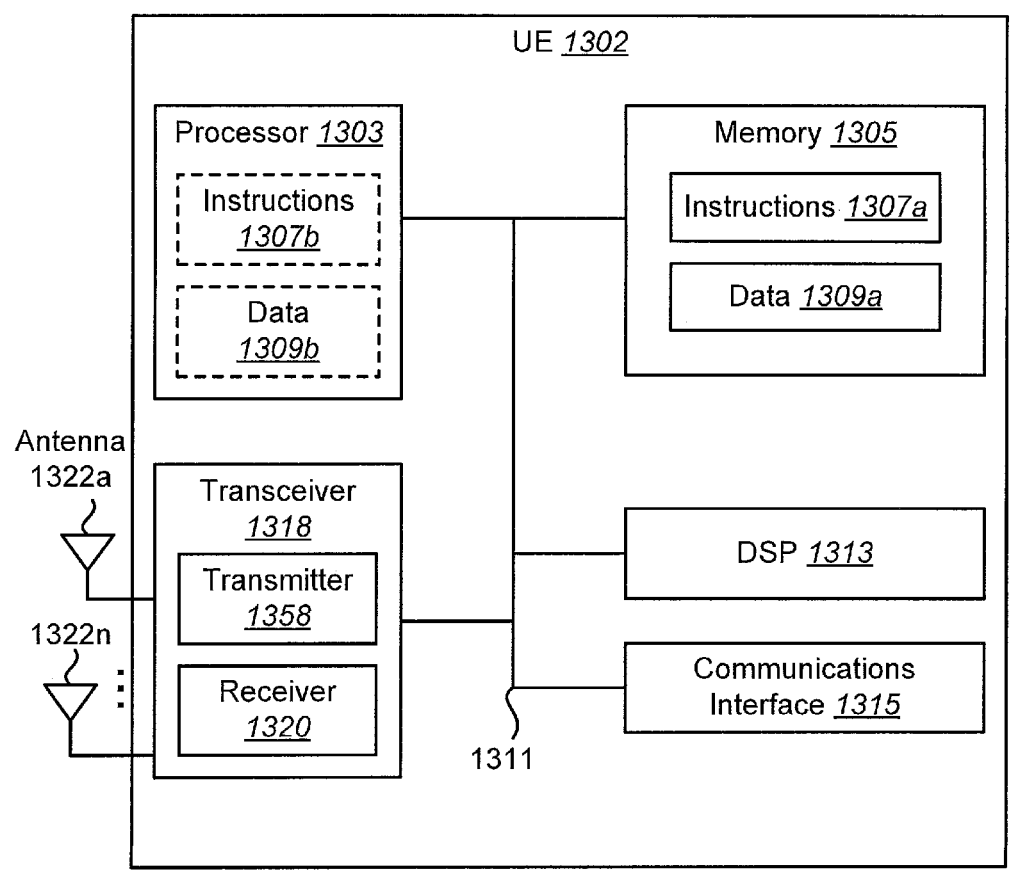
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random-access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described herein.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
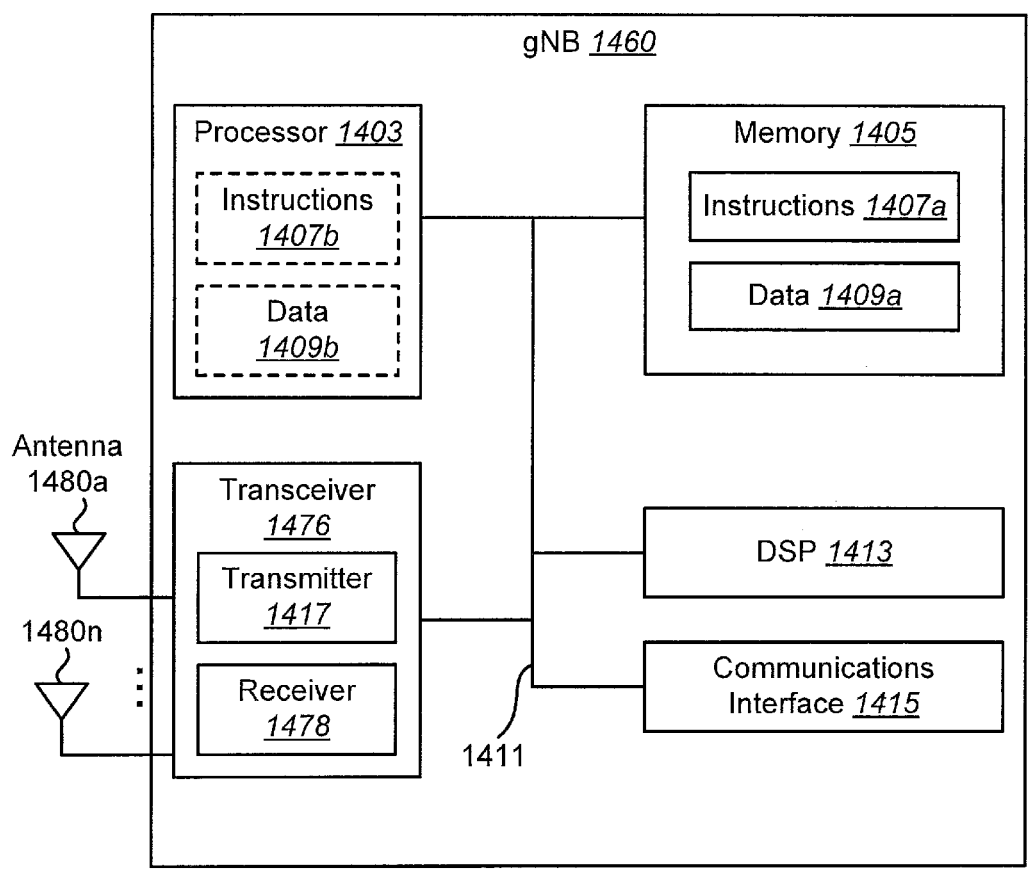
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random-access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described herein.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
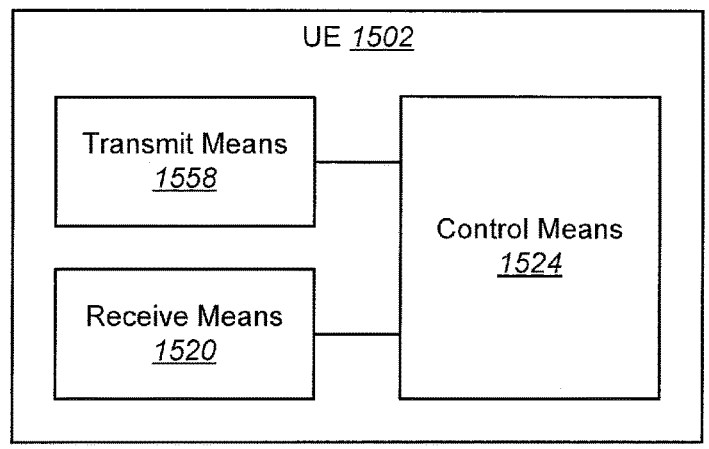
FIG. 15 is a block diagram illustrating one implementation of a UE in which the systems and methods described herein may be implemented.

FIG. 15 is a block diagram illustrating one implementation of a UE 1502 in which the systems and methods described herein may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
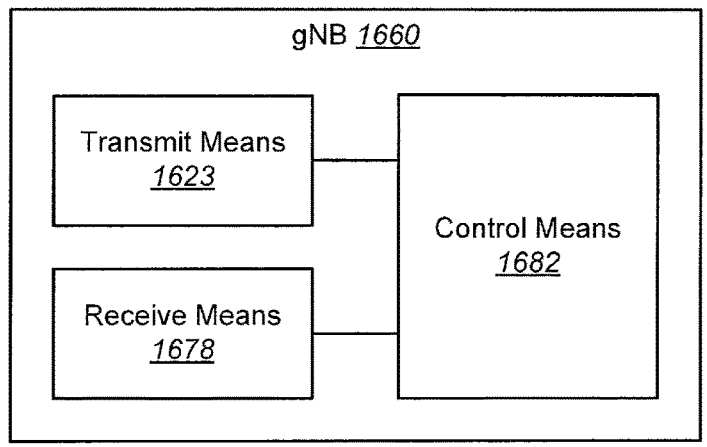
FIG. 16 is a block diagram illustrating one implementation of a gNB in which the systems and methods described herein may be implemented.

FIG. 16 is a block diagram illustrating one implementation of a gNB 1660 in which the systems and methods described herein may be implemented. The gNB 1660 includes transmit means 1623, receive means 1678 and control means 1682. The transmit means 1623, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

FIG. 17 illustrates examples of dropping behaviors for collision between channels with different priorities. In FIG. 17, transmission of the high-priority channel 1702 comes earlier than or at the same symbol as the low-priority channel 1704. In example 17a, the high-priority channel 1702 starts at the same symbol as the low-priority channel

1704. In example 17*b*, the high-priority channel 1702 starts earlier than the low-priority channel 1704. In these examples, the low-priority channel 1704 is fully dropped (represented by an "X" symbol in FIG. 17) without transmission, and only the high-priority channel 1702 is transmitted.

FIG. 18 illustrates other examples of dropping behaviors for collision between channels with different priorities. In the examples of FIG. 18, transmission of the high-priority channel 1802 starts after the low-priority channel 1804. And the high-priority channel 1802 punctures the low-priority channel 1804 from the overlapping symbol. In example 18*a*, if there are remaining symbol(s) on the low-priority channel 1804 after transmission of the high-priority channel 1802, the remaining symbol(s) on the low-priority channel transmission are resumed and still transmitted. In example 18*b*, the low-priority channel 1804 is not resumed after puncturing, thus the remaining symbol(s) on the low-priority channel transmission are also dropped (represented by an "X" symbol in FIG. 18*b*).

FIG. 19 illustrates another example of dropping behaviors for collision between channels with different priorities. In the example of FIG. 19, the low-priority channel 1904 is fully dropped if transmission of the high-priority channel 1902 is known before the low-priority channel transmission. FIG. 19 shows the time 1906 when the transmission of the high-priority channel 1902 is known. In some examples, the status (e.g., time 1906) of the transmission of the high-priority channel 1902 may be known with different time constraints depending the UCI or data carried on the high-priority channel 1902.

The high priority transmission may be known under different timing assumptions. In one method (Method 1), if the high-priority channel 1902 is configured with subslot structure, the high-priority channel 1902 is assumed to be known before the subslot that contains the high-priority channel 1902.

In a second method (Method 2), the timing (e.g., time 1906) that the high-priority channel transmission is known is determined by the UCI or channel type. HARQ-ACK for PDSCH transmission is known before the subslot that contains the PUCCH for HARQ-ACK reporting or after the scheduling DCI and/or PDSCH transmission and a processing time of N1 symbols. DG PUSCH transmission is known before the subslot that contains the PUSCH transmission or after the scheduling DCI and a processing time of N2 symbols. CG PUSCH transmission is known depending on if there is data in the buffer for the traffic, and the arrival time of new data. SR transmission is known depending on if there is data in the buffer for the traffic, and the arrival time of new data.

Figure 20:
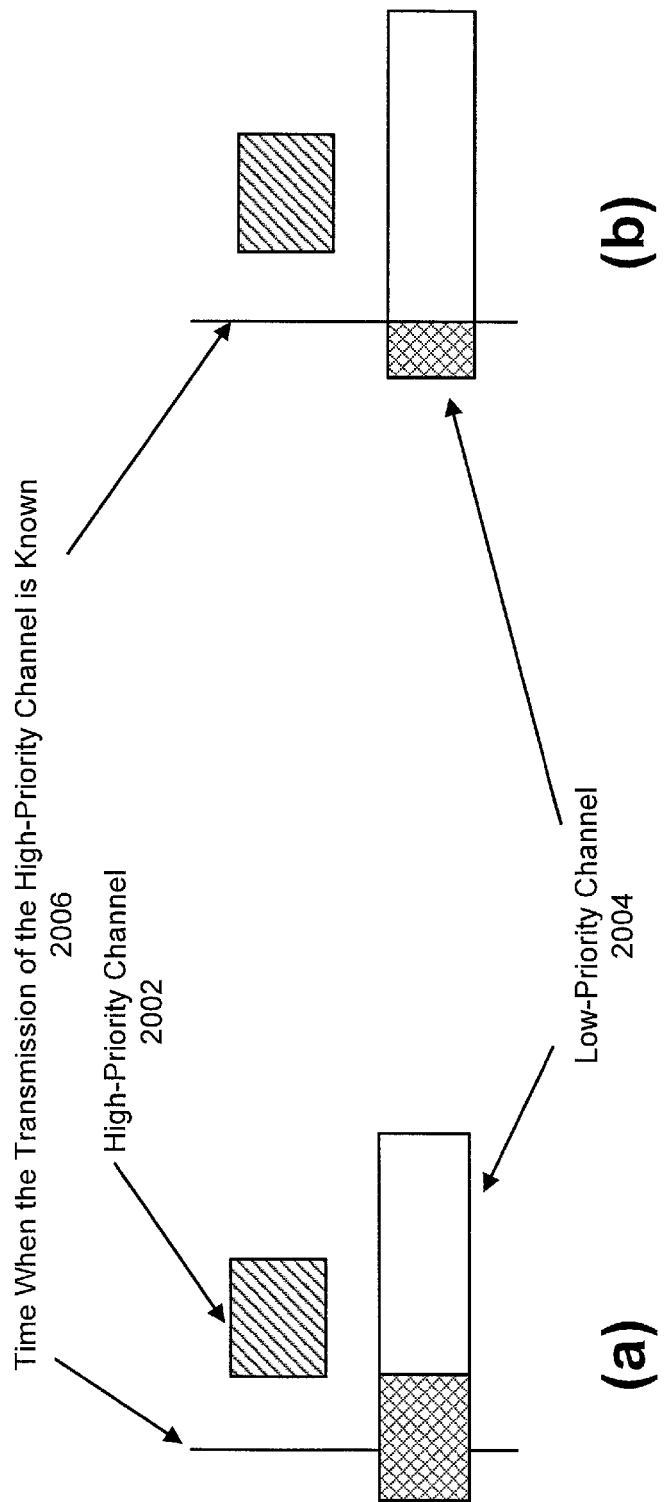
FIG. 20 illustrates yet other examples of dropping behaviors for collision between channels with different priorities.

FIG. 20 illustrates yet other examples of dropping behaviors for collision between channels with different priorities. In FIG. 20, transmission of the low-priority channel 2004 has already started before the time 2006 when the transmission of the high-priority channel 2002 is known. The high-priority channel 2002 should puncture at least all overlapping symbols between the high-priority channel 2002 and the low-priority channel 2004. In example 20*a*, the high-priority channel 2002 punctures the low-priority channel from the overlapping symbol between the high-priority channel 2002 and the low-priority channel 2004, if there are remaining symbol(s) on the low-priority channel after the high priority transmission, in one approach, the remaining symbol(s) on the low-priority channel transmission are also dropped. In example 20*b*, the high-priority channel 2002 punctures the low-priority channel 2004 from the symbol (i.e., time 2006) when the transmission of the high-priority channel 2002 is known at the UE. As illustrated in example 20*b*, if there are remaining symbol(s) on the punctured low-priority channel 2004 after the high-priority transmission, the remaining symbol(s) on the low-priority channel transmission are also dropped.

The high priority transmission may be known under different timing assumptions, as described in connection with FIG. 19.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

<Summary>

In one example, a user equipment (UE), comprises: a higher layer processor configured to determine that a high-priority channel collides with a low-priority channel, the high-priority channel and the low-priority channel being uplink channels; the higher layer processor configured to drop at least a portion of the low-priority uplink channel; and transmitting circuitry configured to transmit the high-priority channel.

In one example, the UE, wherein if the high-priority channel starts at a same symbol as the low-priority channel or the high-priority channel starts earlier than the low-priority channel, the low-priority channel is fully dropped without transmission, and only the high-priority channel is transmitted.

In one example, the UE, wherein if a starting symbol of a low-priority channel is earlier than a high-priority channel, the high-priority channel punctures the low-priority channel from an overlapping symbol.

In one example, the UE, wherein if a starting symbol of a low-priority channel is earlier than a high-priority channel, the low-priority channel is fully dropped or punctured by the high-priority channel based on a timing relationship.

In one example, the UE, wherein if channel status or transmission of the high-priority channel is known before the start of the low priority transmission, the low-priority channel is fully dropped without transmission, and only the high-priority channel is transmitted.

In one example, the UE, wherein if the low-priority channel transmission is already started, the high-priority channel punctures the ongoing low-priority channel.

In one example, the UE, wherein if the high-priority channel is configured with subslot structure, the high-priority channel is assumed to be known before a subslot that contains the high-priority channel.

In one example, the UE, wherein the timing that transmission of the high-priority channel is known is determined by uplink control information (UCI) or channel type.

In one example, a base station (gNB), comprises: a higher layer processor configured to determine that a high-priority channel collides with a low-priority channel, the high-priority channel and the low-priority channel being uplink channels; the higher layer processor configured to drop at least a portion of the low-priority uplink channel; and receiving circuitry configured to receive the high-priority channel.

In one example, the gNB, wherein if the high-priority channel starts at a same symbol as the low-priority channel or the high-priority channel starts earlier than the low-priority channel, the low-priority channel is fully dropped without transmission, and only the high-priority channel is transmitted.

In one example, the gNB, wherein if a starting symbol of a low-priority channel is earlier than a high-priority channel, the high-priority channel punctures the low-priority channel from an overlapping symbol.

In one example, the gNB, wherein if a starting symbol of a low-priority channel is earlier than a high-priority channel, the low-priority channel is fully dropped or punctured by the high-priority channel based on a timing relationship.

In one example, the gNB, wherein if channel status or transmission of the high-priority channel is known before the start of the low priority transmission, the low-priority channel is fully dropped without transmission, and only the high-priority channel is transmitted.

In one example, the gNB, wherein if the low-priority channel transmission is already started, the high-priority channel punctures the ongoing low-priority channel.

In one example, the gNB, wherein if the high-priority channel is configured with subslot structure, the high-priority channel is assumed to be known before a subslot that contains the high-priority channel.

In one example, the gNB, wherein the timing that transmission of the high-priority channel is known is determined by uplink control information (UCI) or channel type.

In one example, a method by a user equipment (UE), comprises: determining that a high-priority channel collides with a low-priority channel, the high-priority channel and the low-priority channel being uplink channels; dropping at least a portion of the low-priority uplink channel; and transmitting the high-priority channel.

In one example, a method by a base station (gNB), comprises: determining that a high-priority channel collides with a low-priority channel, the high-priority channel and the low-priority channel being uplink channels; dropping at least a portion of the low-priority uplink channel; and receiving the high-priority channel.

In one example, a user equipment (UE), comprises: a higher layer processor configured to determine that a transmission of a first uplink channel with high-priority overlaps in time with a transmission of a second uplink channel with low-priority, where the uplink channel may be a PUCCH or a PUSCH; the higher layer processor configured to drop the second uplink channel with low-priority; and transmitting circuitry configured to transmit the first uplink channel with high-priority.

In one example, the UE, wherein the UE drops the second uplink channel with low-priority by canceling the second PUCCH/PUSCH transmissions of smaller priority index before the first symbol overlapping with the first PUCCH/PUSCH transmission of larger priority index.

In one example, the UE, wherein the first uplink channel with high priority is a PUCCH for HARQ-ACK of larger priority index scheduled by a DCI format in a PDCCH reception, and the second uplink channel is a PUSCH or a PUCCH of smaller priority index, the UE cancels the transmission of the second PUSCH or the second PUCCH before the first symbol that would overlap with the first PUCCH transmission, and no early than a delay after a last symbol of the corresponding PDCCH reception, where the delay is determined by UE capabilities and processing time.

In one example, the UE, wherein the first uplink channel with high priority is a first PUSCH of larger priority index scheduled by a DCI format in a PDCCH reception, and the second uplink channel is a PUSCH or a PUCCH of smaller priority index, the UE cancels the transmission of the second PUSCH or the second PUCCH before the first symbol that would overlap with the first PUCCH transmission, and no early than a delay after a last symbol of the corresponding PDCCH reception, where the delay is determined by the PUSCH preparation time for a corresponding UE processing capability and UE capabilities.

In one example, the UE, wherein the first uplink channel with high priority is a PUCCH of larger priority index with SR, and the second uplink channel is a PUSCH or a PUCCH of smaller priority index, the UE cancels the transmission of the second PUSCH or the second PUCCH before the first symbol that would overlap with the first PUCCH transmission.

In one example, the UE, wherein the first uplink channel with high priority is a configured grant PUSCH of larger priority index, and the second uplink channel is a PUSCH or a PUCCH of smaller priority index, the UE cancels the transmission of the second PUSCH or the second PUCCH before the first symbol that would overlap with the first PUCCH transmission.

In one example, a base station (gNB), comprises: a higher layer processor configured to determine that a transmission of a first uplink channel with high-priority overlaps in time with a transmission of a second uplink channel with low-priority, where the uplink channel may be a PUCCH or a PUSCH; the higher layer processor configured to drop the second uplink channel with low-priority; and receiving circuitry configured to receive the first uplink channel with high-priority.

In one example, the gNB, wherein the gNB drops the second uplink channel with low-priority by canceling the second PUCCH/PUSCH reception of smaller priority index before the first symbol overlapping with the first PUCCH/PUSCH transmission of larger priority index.

In one example, the gNB, wherein the first uplink channel with high priority is a PUCCH for HARQ-ACK of larger priority index scheduled by a DCI format in a PDCCH reception, and the second uplink channel is a PUSCH or a PUCCH of smaller priority index, the gNB cancels the reception of the second PUSCH or the second PUCCH before the first symbol that would overlap with the first PUCCH transmission, and no early than a delay after a last symbol of the corresponding PDCCH transmission, where the delay is determined by UE capabilities and processing time.

In one example, the gNB, wherein the first uplink channel with high priority is a first PUSCH of larger priority index scheduled by a DCI format in a PDCCH reception, and the second uplink channel is a PUSCH or a PUCCH of smaller priority index, the gNB cancels the reception of the second PUSCH or the second PUCCH before the first symbol that would overlap with the first PUCCH transmission, and no early than a delay after a last symbol of the corresponding PDCCH transmission, where the delay is determined by the PUSCH preparation time for a corresponding UE processing capability and UE capabilities.

In one example, the gNB, wherein the first uplink channel with high priority is a PUCCH of larger priority index with SR, and the second uplink channel is a PUSCH or a PUCCH of smaller priority index, the gNB cancels the reception of the second PUSCH or the second PUCCH before the first symbol that would overlap with the first PUCCH reception.

In one example, the gNB, wherein the first uplink channel with high priority is a configured grant PUSCH of larger priority index, and the second uplink channel is a PUSCH or a PUCCH of smaller priority index, the gNB cancels the reception of the second PUSCH or the second PUCCH before the first symbol that would overlap with the first PUCCH reception.

In one example, a method by a user equipment (UE), comprises: determining that a transmission of a first uplink channel with high-priority overlaps in time with a transmission of a second uplink channel with low-priority, where the uplink channel may be a PUCCH or a PUSCH; dropping the second uplink channel with low-priority; and transmitting the first uplink channel with high-priority.

In one example, a method by a base station (gNB), comprises: determining that a transmission of a first uplink channel with high-priority overlaps in time with a transmission of a second uplink channel with low-priority, where the uplink channel may be a PUCCH or a PUSCH; dropping the second uplink channel with low-priority; and receiving the first uplink channel with high-priority.

The invention claimed is:
1. A user equipment (UE), comprising:
   a processor configured to:
      determine that a transmission of a first uplink channel with a high-priority overlaps in time domain with a transmission of a second uplink channel with a low-priority, and cancel the transmission of the second uplink channel with the low-priority before a first symbol of the second uplink channel with the low-priority, the first symbol being a symbol from which the second uplink channel with the low-priority overlaps with the first uplink channel with the high-priority; and transmitting circuitry configured to transmit the first uplink channel with the high-priority, wherein a starting timing of cancelling the transmission of the second uplink channel is determined based on a processing time for scheduling and based on a UE capability, and the processing time starts after the UE receives downlink control information (DCI) for the scheduling and ends before the UE transmits the first uplink channel.

2. A method performed by a user equipment (UE), the method comprising:

determining that a transmission of a first uplink channel with a high-priority overlaps in time domain with a transmission of a second uplink channel with a low-priority;

cancelling the transmission of the second uplink channel with the low-priority before a first symbol of the second uplink channel with the low-priority, the first symbol being a symbol from which the second uplink channel with the low-priority overlaps with the first uplink channel with the high-priority; and transmitting the first uplink channel with the high-priority, wherein a starting timing of cancelling the transmission of the second uplink channel is determined based on a processing time for scheduling and based on a UE capability, and the processing time starts after the UE receives downlink control information (DCI) for the scheduling and ends before the UE transmits the first uplink channel.

3. The UE of claim 1, wherein the processing time is determined based on whether the first uplink channel is a Physical Uplink Control Channel (PUCCH) or a Physical Uplink Shared Channel (PUSCH).

\* \* \* \* \*